United States Patent
Taniguchi et al.

(10) Patent No.: US 7,692,864 B2
(45) Date of Patent: Apr. 6, 2010

(54) CRYSTALLIZATION APPARATUS, OPTICAL MEMBER FOR USE IN CRYSTALLIZATION APPARATUS, CRYSTALLIZATION METHOD, MANUFACTURING METHOD OF THIN FILM TRANSISTOR, AND MANUFACTURING METHOD OF MATRIX CIRCUIT SUBSTRATE OF DISPLAY

(75) Inventors: Yukio Taniguchi, Yokohama (JP);
Masakiyo Matsumura, Yokohama (JP);
Hirotaka Yamaguchi, Yokohama (JP);
Mikihiko Nishitani, Yokohama (JP);
Susumu Tsujikawa, Yokohama (JP);
Yoshinobu Kimura, Yokohama (JP);
Masayuki Jyumonji, Yokohama (JP)

(73) Assignee: Advanced LCD Technologies Development Center Co., Ltd., Yokohama (JP)

( * ) Notice: Subject to any disclaimer, the term of this patent is extended or adjusted under 35 U.S.C. 154(b) by 0 days.

(21) Appl. No.: 12/403,726

(22) Filed: Mar. 13, 2009

(65) Prior Publication Data
US 2009/0180190 A1 Jul. 16, 2009

Related U.S. Application Data

(62) Division of application No. 11/442,331, filed on May 30, 2006, now Pat. No. 7,537,660, which is a division of application No. 10/603,821, filed on Jun. 26, 2003, now Pat. No. 7,101,436.

(30) Foreign Application Priority Data
Jun. 28, 2002 (JP) ............................. 2002-188846

(51) Int. Cl.
*G02B 27/10* (2006.01)
(52) U.S. Cl. ..................... 359/626; 359/618; 359/619

(58) Field of Classification Search ................. 359/618, 359/619, 626
See application file for complete search history.

(56) References Cited

U.S. PATENT DOCUMENTS
5,016,149 A * 5/1991 Tanaka et al. ............... 362/259

(Continued)

FOREIGN PATENT DOCUMENTS
JP 2001-176772 6/2001

OTHER PUBLICATIONS

W. Yeh et al., Jpn. J. Appl. Physics, vol. 41, part 1, No. 4A, pp. 1909-1914, "Proposed Sample Structure for Marked Enlargement of Excimer-Laser-Induced Lateral Grain Growth in Si Thin Films", Apr. 2002.

(Continued)

*Primary Examiner*—William C Choi
(74) *Attorney, Agent, or Firm*—Oblon, Spivak, McClelland, Maier & Neustadt, L.L.P.

(57) ABSTRACT

A crystallization method includes wavefront-dividing an incident light beam into a plurality of light beams, condensing the wavefront-divided light beams in a corresponding phase shift portion of a phase shift mask or in the vicinity of the phase shift portion to form a light beam having an light intensity distribution of an inverse peak pattern in which a light intensity is minimum in a point corresponding to the phase shift portion of the phase shift mask, and irradiating a polycrystalline semiconductor film or an amorphous semiconductor film with the light beam having the light intensity distribution to produce a crystallized semiconductor film.

2 Claims, 12 Drawing Sheets

U.S. PATENT DOCUMENTS

| | | |
|---|---|---|
| 6,388,386 B1 | 5/2002 | Kunii et al. |
| 6,734,635 B2 | 5/2004 | Kunii et al. |
| 6,746,942 B2 | 6/2004 | Sato et al. |
| 2001/0005286 A1 | 6/2001 | Lee et al. |
| 2002/0047580 A1 | 4/2002 | Kunii et al. |
| 2002/0104750 A1 | 8/2002 | Ito |
| 2003/0099264 A1 | 5/2003 | Dantus et al. |
| 2003/0231663 A1 | 12/2003 | Ohtsuki et al. |
| 2004/0005744 A1 | 1/2004 | Taniguchi et al. |
| 2004/0036969 A1 | 2/2004 | Taniguchi et al. |
| 2004/0061149 A1 | 4/2004 | Jyumonji et al. |
| 2004/0126674 A1 | 7/2004 | Taniguchi et al. |
| 2004/0142544 A1 | 7/2004 | Kimura et al. |
| 2004/0161913 A1 | 8/2004 | Kawasaki et al. |
| 2004/0266080 A1 | 12/2004 | Jyumonji et al. |

OTHER PUBLICATIONS

M. Nakata et al., Jpn. J. Appl. Physics, vol. 40, part 1, No. 5A, pp. 3049-3054, "A New Nucleation-Sit-Control Excimer-Laser-Crystallization Method", May 2001.

C.H. Oh et al., Jpn. J. Appl. Physics, vol. 37, part 2, No. 5A, pp. L492-L495, "A Novel Phase-Modulated Excimer-Laser Crystallization Method of Silicon Thin Films", May 1, 1998.

M. Matsumura et al., Thin Solid Films, vol. 337, pp. 123-128, "Advanced Excimer-Laser Annealing Process for Quasi Single-Crystal Silicon Thin-Film Devices", 1999.

M. Matsumura, Applied Physics, vol. 71, No. 5, pp. 543-547, "Excimer-Laser-Grown Silicon Thin Films With Ultralarge Grains", 2002.

Masakiyo Matsumura, Surface Science, vol. 21, No. 5, pp. 278-287, "Preparation of Ultra-Large Grain Silicon Thin-Films by Excimer-Laser", 2000.

2000-306859, Published Nov. 2, 2000.

M. Nakata et al., "Two-Dimensionally Position-Controlled Ultra-Large Grain Growth Based on Phase-Modulated Excimer-Laser Annealing Method", Dept. of Physical Electronics, Tokyo Institute of Technology, Electrochemical Society Proceedings, vol. 2000-31, pp. 148-154.

Wen-Chang Yeh et al., Effects of a Low-Melting-Point Underlayer on Excimer-Laser-Induced Lateral Crystallization of Si Thin-Films, Jpn. J. Appl. Physics, vol. 40 (2001), Part 1, No. 5A, May 2001, pp. 3096-3100.

Y. Sano et al., "Highly Packed and Ultra-Large Si Grains Grown by a Single-Shot Irradiation of Excimer-Laser Light Pulse", Dept. of Physical Electronics, Tokyo Institute of Technology, 8 pages.

* cited by examiner

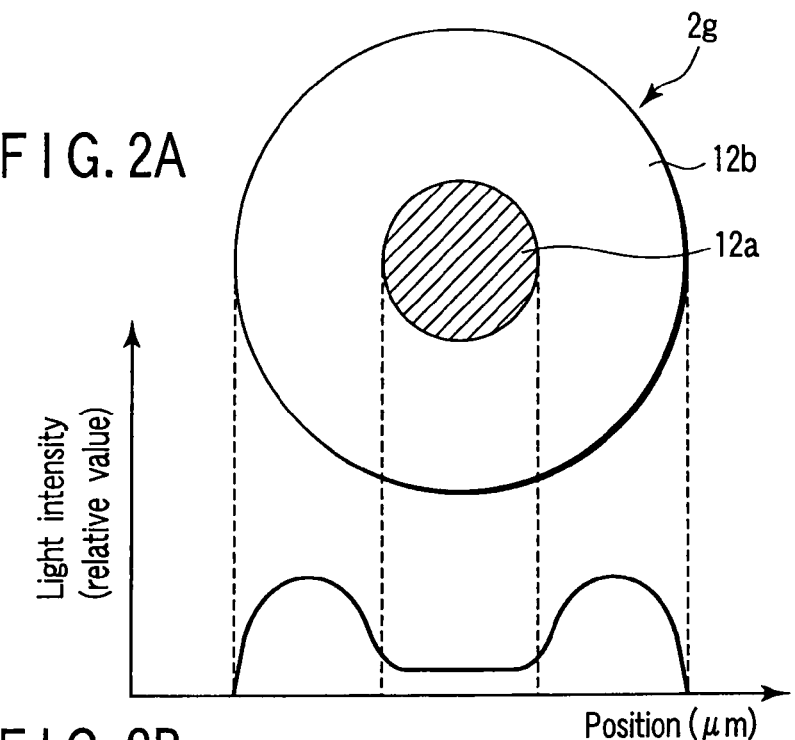
FIG. 2A
FIG. 2B
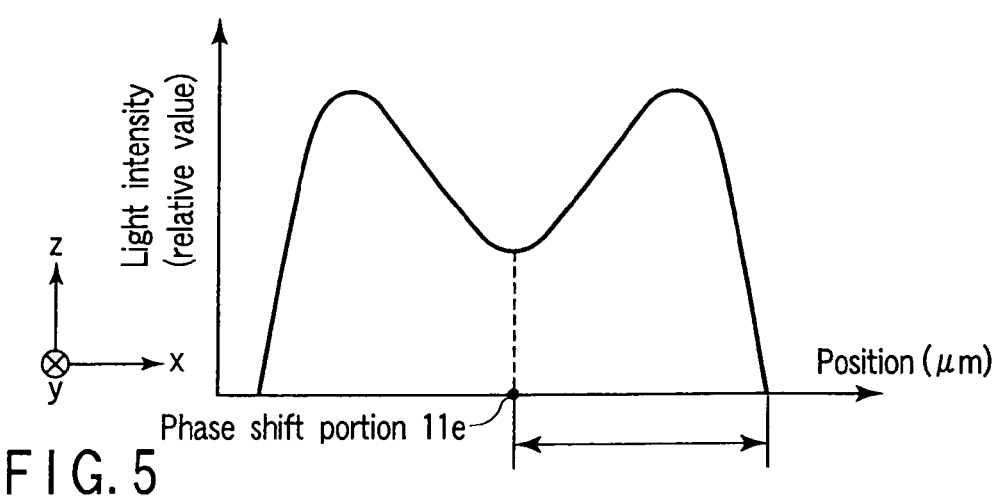
FIG. 4
FIG. 5

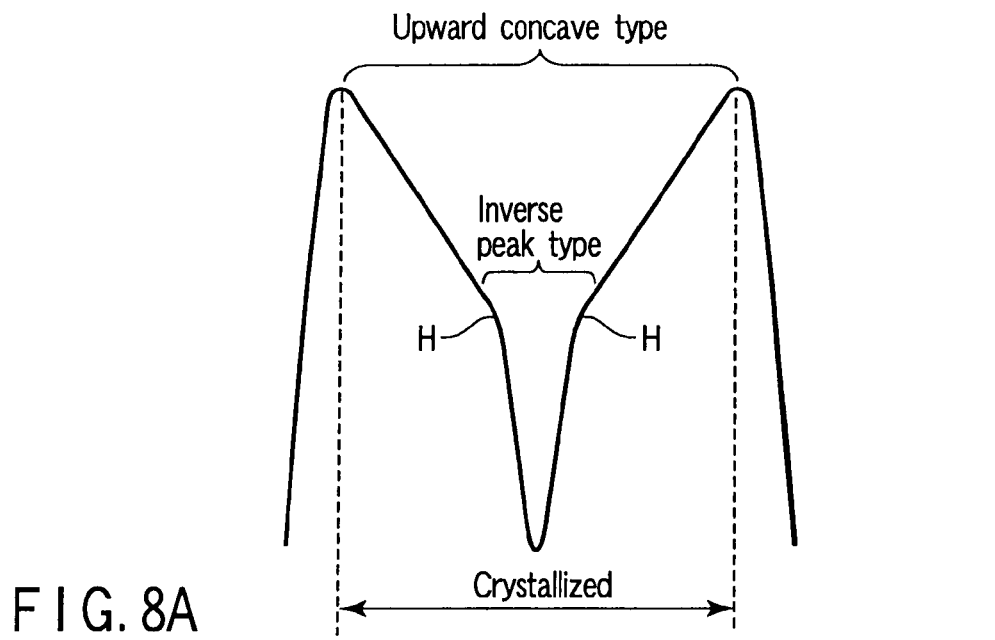
F I G. 8A
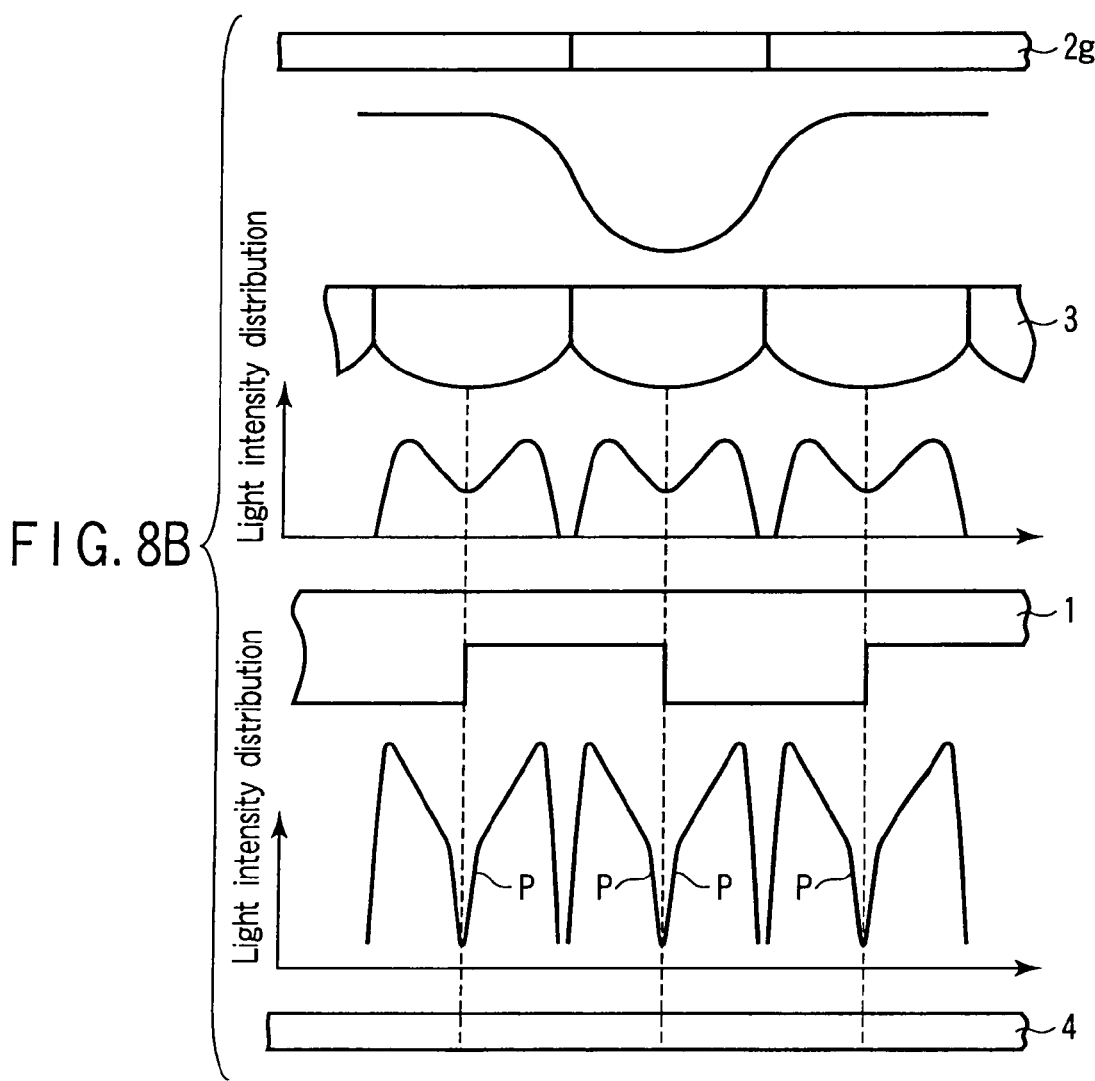
F I G. 8B

CRYSTALLIZATION APPARATUS, OPTICAL MEMBER FOR USE IN CRYSTALLIZATION APPARATUS, CRYSTALLIZATION METHOD, MANUFACTURING METHOD OF THIN FILM TRANSISTOR, AND MANUFACTURING METHOD OF MATRIX CIRCUIT SUBSTRATE OF DISPLAY

CROSS-REFERENCE TO RELATED APPLICATIONS

This application is a Divisional of U.S. patent application Ser. No. 11/442,331, filed May 30, 2006, which is a Divisional of U.S. patent application Ser. No. 10/603,821, filed Jun. 26, 2003, and is based upon and claims the benefit of priority from the prior Japanese Patent Application No. 2002-188846, filed Jun. 28, 2002. The entire contents of these applications are incorporated herein by reference.

BACKGROUND OF THE INVENTION

1. Field of the Invention

The present invention relates to a crystallization apparatus for irradiating an amorphous or polycrystalline semiconductor film with a laser beam to produce a crystallized semiconductor film, an optical member for use in the crystallization apparatus, a crystallization method, a thin film transistor, and a display apparatus. The present invention particularly relates to an apparatus and method in which an amorphous or polycrystalline semiconductor film is irradiated with a laser beam phase-modulated using a phase shift mask to produce a crystallized semiconductor film.

2. Description of the Related Art

A material of a thin film transistor (TFT) for use in a switching device for controlling a voltage to be applied to a pixel, for example, of a liquid crystal display (LCD) has heretofore roughly been classified into amorphous silicon, poly silicon and single crystal silicon.

Amorphous silicon can obtain a high withstand property. Poly silicon has an electron mobility higher than that of amorphous silicon. Therefore, a transistor formed by poly silicon has advantages that a switching speed is high, a response of a display is high, and a design margin of another component is reduced as compared with a transistor formed by amorphous silicon. In addition to a main body of a display, peripheral circuits such as a driver circuit and DAC can be incorporated in the display. In this case, these peripheral circuits can be operated at a higher speed.

Poly silicon is constituted of an aggregate of crystal grains, and has lower electron or hole mobility than single crystal silicon. Moreover, in the thin film transistor (FET) formed using the poly silicon, fluctuation of the number of crystal grain boundaries existing in a channel portion is a problem. To solve the problem, a crystallization method of producing poly silicon having a larger grain diameter has been recently proposed in order to enhance the mobility of electrons or holes and to reduce the fluctuation of the number of crystal grain boundaries in the channel portion of each FET.

As this type of crystallization method, a "phase control excimer laser annealing (ELA)" has heretofore been known in which a polycrystalline or amorphous semiconductor film is irradiated with an excimer laser beam via a phase shift mask to produce a crystallized semiconductor film. Details of the phase control ELA are described in, for example, "Surface Science Vol. 21, No. 5, pp. 278 to 287, 2000" and Jpn. Pat. Appln. KOKAI Publication No. 2000-306859.

In the phase control ELA, an inverse peak type light intensity distribution (light intensity distribution in which a light intensity rapidly increases as a distance from a position having a minimum light intensity increases) is generated by the phase shift mask. The polycrystalline or amorphous semiconductor film is irradiated with light beams which periodically have the inverse peak type light intensity distribution. As a result, a molten region is generated in accordance with the light intensity distribution, and a crystal nucleus is formed in a portion which is disposed opposite to a position having a minimum light intensity and which is not molten or which first coagulates. When a crystal grows from the crystal nucleus toward periphery in a lateral direction (lateral growth), crystal grains having a large grain diameter (monocrystal) are generated.

For example, when a liquid crystal display is manufactured, a ratio of a transistor forming region requiring the above-described crystallization in each pixel region is usually very small. In a conventional art, for example, the phase shift mask including a plurality of two-dimensionally arranged phase shift portions is uniformly irradiated with the laser beam. Therefore, a large part of the laser beam supplied from an optical illumination system does not contribute to the crystallization of the transistor forming region, and a so-called light amount loss is very large.

Moreover, as described above, in the conventional art, the semiconductor film is irradiated with light beams which have the inverse peak type light intensity distribution. In the light intensity distribution, the crystal nucleus is formed in the portion disposed opposite to the position in which the light intensity is minimized. Therefore, it is possible to control the forming position of the crystal nucleus. However, it is impossible to control the light intensity distribution in an intermediate portion between two inverse peak portions disposed opposite to each other.

In actual, in the conventional art, in general, the light intensity distribution in the intermediate portion involves irregular surges (wave-shaped distribution in which increase and decrease of the light intensity are repeated). In this case, in a process of crystallization, the lateral growth started toward the periphery from the crystal nucleus stops in a portion in which the light intensity decreases in the intermediate portion, and there is a problem that the growth of large crystals is inhibited. Moreover, even if a substantially uniform light intensity distribution is obtained in the intermediate portion, the lateral growth stops in an arbitrary position in this uniform light intensity distribution, and there is a problem that the growth of large crystals is inhibited.

BRIEF SUMMARY OF THE INVENTION

An object of the present invention is to provide a crystallization apparatus and method in which a large part of light supplied from an optical illumination system can contribute to crystallization of a desired region and in which light efficiency is satisfactory.

Another object of the present invention is to provide a crystallization apparatus and method in which sufficient lateral growth from a crystal nucleus can be realized to produce a crystallized semiconductor film having a large grain diameter.

Further object of the present invention is to provide a manufacturing method of a thin film transistor having an effect similar to the above-described effect, and a manufacturing method of a matrix circuit substrate of a display.

To solve the problem, according to a first aspect of the present invention, there is provided a crystallization apparatus which comprises an optical illumination system to allow a light beam having a homogeneous light intensity distribution to be incident upon an amorphous semiconductor film or a polycrystalline semiconductor film and which irradiates the amorphous semiconductor film or the polycrystalline semiconductor film with the light beam to crystallize the amorphous or polycrystalline semiconductor film. The device comprises a wavefront dividing element which divides a wavefront of the incident light beam into a so as plurality of light beams, and a phase shift mask which gives a phase difference between partially transmitted light beams and which converts the light beams into a light beam having an inverse peak type light intensity distribution and which comprises a phase shift portion to determine a position where the inverse peak type light intensity distribution is minimized. The wavefront dividing element is positioned on a light path between the optical illumination system and a non-crystallized semiconductor film. The phase shift mask is positioned on the light path between the wavefront dividing element and the non-crystallized semiconductor film. The wavefront dividing element and phase shift mask are positioned so that a predetermined region around the phase shift portion is irradiated with the light beams having the divided wavefront.

The wavefront dividing element preferably comprises a plurality of optical elements two-dimensionally arranged along two directions crossing at right angles to each other, and each optical element has a two-dimensional condensing function along two directions crossing at right angles to each other. Instead, the wavefront dividing element may comprise a plurality of optical elements one-dimensionally arranged along a predetermined direction, and each optical element has a one-dimensional condensing function along the predetermined direction.

The optical illumination system preferably comprises an light intensity distribution forming element which converts the light beams having a homogeneous light intensity distribution into light beams having an upward concave light intensity distribution. The light intensity distribution forming element and phase shift mask are positioned so that a position to minimize the upward concave light intensity distribution may correspond to the phase shift portion. The light beams which are converted by the light intensity distribution forming element and phase shift mask and with which a non-crystallized semiconductor film is irradiated have an light intensity distribution including an inverse peak portion inside an upward concave portion. The light intensity distribution forming element may comprise a circular middle region having a predetermined transmittance and an annular peripheral region which is formed to surround the middle region and which has a higher transmittance than the middle region. Instead, the light intensity distribution forming element preferably comprises: an elongated middle region which has a predetermined transmittance and which extends along the predetermined direction; and peripheral regions which are formed to hold the middle region between the regions and which have a transmittance higher than that of the middle region. Furthermore, the light intensity distribution forming element preferably has a transmission filter which is disposed in an emission pupil plane of the optical illumination system or in the vicinity of the plane and which has a predetermined transmittance distribution.

The polycrystalline or amorphous semiconductor film is preferably disposed in parallel with or in the vicinity of the phase shift mask. The apparatus further comprises an optical image forming system which is disposed on a light path between the polycrystalline or amorphous semiconductor film and the phase shift mask disposed apart from the film. The polycrystalline or amorphous semiconductor film may be disposed at a predetermined distance from a plane optically conjugated with the phase shift mask along an optical axis of the optical image forming system. Furthermore, in the apparatus further comprising an optical image forming system disposed on the light path between the polycrystalline or amorphous semiconductor film and the phase shift mask, the polycrystalline or amorphous semiconductor film is set in the vicinity of the plane optically conjugated with the phase shift mask, and an image-side numerical aperture of the optical image forming system may also be set to a value required for generating the inverse peak type light intensity distribution.

According to a second aspect of the present invention, there is provided an optical member comprising: a wavefront dividing portion which condenses light beams having a homogeneous incident light intensity distribution so as to irradiate a predetermined region only; and an optical converting portion which converts the light beams into a light beam having an inverse peak type light intensity distribution.

According to a third aspect of the present invention, there is provided a crystallization method comprising: condensing light beams so as to irradiate a predetermined region only; converting the light beams into a light beam having an inverse peak type light intensity distribution; and irradiating and crystallizing the predetermined region of a non-crystallized semiconductor film (amorphous or polycrystalline semiconductor film) with the converted light beams.

According to the third aspect, the light beam having the homogeneous light intensity distribution is converted to the light beam having the upward concave light intensity distribution. Alternatively, the light beam having an light intensity distribution including an inverse peak portion inside an upward concave portion are formed into an image in a position disposed apart from an optically conjugated plane by a predetermined distance along an optical axis, and a non-crystallized semiconductor film is irradiated and crystallized with the light beams formed into the image.

According to a fourth aspect, there is provided a crystallization method comprising: condensing light beams having a homogeneous light intensity distribution to irradiate a predetermined region only; converting the condensed light beams into a light beam having an inverse peak type light intensity distribution; and irradiating and crystallizing the predetermined region only of a non-crystallized semiconductor film with the converted light beams.

BRIEF DESCRIPTION OF THE SEVERAL VIEWS OF THE DRAWING

FIGS. 2A and 2B are diagrams schematically showing a transmission filter disposed in an emission pupil plane of an optical illumination system or in the vicinity of the plane, and a light intensity of a light beam transmitted through the filter;

FIG. 4 is a top plan view showing a structure or repetition of the phase shift mask;

FIG. 5 is a diagram showing an light intensity distribution of light beams transmitted through both the transmission filter and micro lens array;

FIG. 8A is a diagram showing the light intensity distribution of a light beam transmitted through three members including the transmission filter, micro lens array, and phase shift mask;

FIG. 8B is a diagram showing light intensity distribution patterns of the light beam passed through the transmission filter, micro lens array, and phase shift mask;

DETAILED DESCRIPTION OF THE INVENTION

Embodiments of the present invention will be described with reference to the accompanying drawings.

Figure 1:
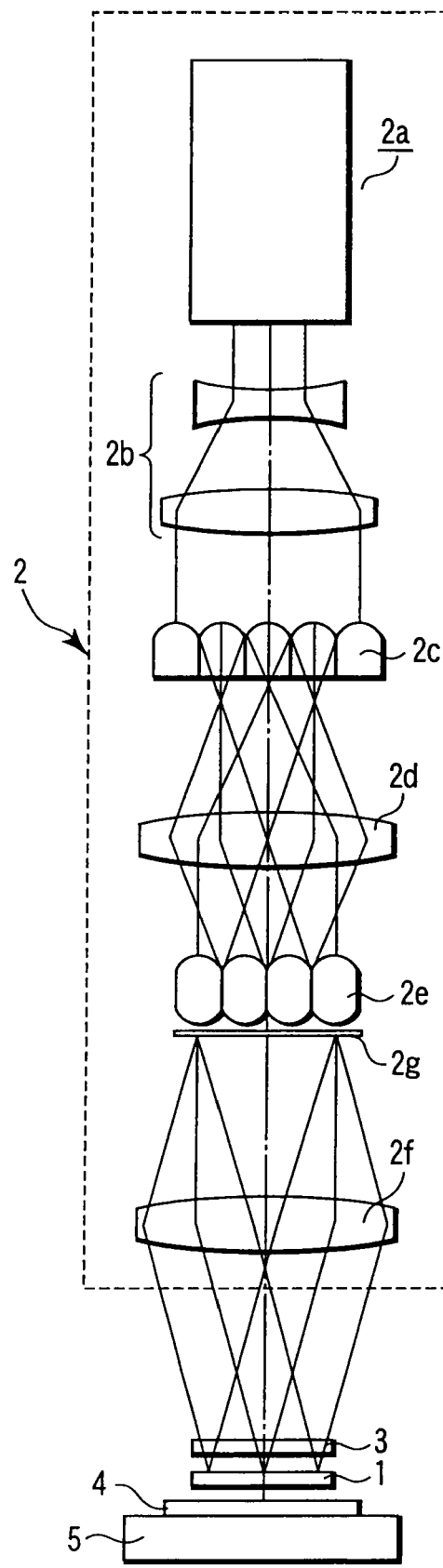
FIG. 1 is a diagram schematically showing a crystallization apparatus according to a first embodiment of the present invention.

FIG. 1 is a diagram schematically showing a constitution of a crystallization apparatus according to a first embodiment of the present invention. As shown in FIG. 1, a crystallization apparatus of a first embodiment comprises: an optical illumination system 2 for illuminating a semiconductor film of a substrate to be treated 4; a micro lens array 3 which is a wavefront dividing element disposed on a light path between the substrate to be treated 4 and optical illumination system 2; and a phase shifter, that is, phase shift mask 1 disposed on the light path between the micro lens array 3 and substrate to be treated 4.

A top surface of a semiconductor film of the substrate to be treated 4 is disposed in parallel with and in the vicinity of (e.g., several micrometers to several hundreds of micrometers) the phase shift mask 1. The semiconductor film is constituted by a non-single-crystal semiconductor film such as polycrystalline and amorphous semiconductor films on a support substrate. The substrate is obtained, for example, by forming an amorphous silicon film directly on a glass plate for the liquid crystal display, or on underlayer film such as an $SiO_2$ film formed on the substrate by a chemical vapor growth method. In the present embodiment, the phase shift mask 1 is disposed opposite to the amorphous semiconductor film. The substrate to be treated 4 is held in a predetermined position on a substrate stage 5 by a vacuum chuck or electrostatic chuck. For example, the substrate stage 5 is constituted of an x-y-z-θ table. As a result, when the substrate stage 5 is laterally moved, and while the optical illumination system is fixed, the crystallization of the semiconductor film of the substrate to be treated 4 can successively be moved to perform a fixed crystallization step in a broad range.

The optical illumination system 2 includes a KrF excimer laser light source 2a for supplying a laser beam which has a wavelength, for example, of 248 nm; a beam expander 2b for expanding the laser beam from the light source 2a; first and second fly eye lenses 2c, 2e; first and second optical condenser systems 2d, 2f; and a transmission filter 2g which is an light intensity distribution forming element. Another appropriate light source such as an XeCl excimer laser light source can also be used as the light source 2a.

As schematically shown in FIG. 1, the light beam emitted from the light source 2a is expanded by the beam expander 2b, transformed into a parallel light beam, and incident upon the first fly eye lens 2c. Since the light beam incident upon the first fly eye lens 2c undergoes convergence functions by convex lenses of the first fly eye lens 2c, a plurality of point light sources are substantially formed in a focal plane on the back side of the first fly eye lens 2c. The light beams from the plurality of point light sources are picked up as an image by the first optical condenser system 2d, and illuminate the incidence surface of the second fly eye lens 2e disposed behind a focal point in a superimposing manner.

Since the light beams incident upon the second fly eye lens 2e from the plurality of point light sources undergo the convergence functions by the convex lenses of the second fly eye lens 2e, point light sources more than those in the focal plane on the back side of the first fly eye lens 2c are formed in the back-side focal plane of the second fly eye lens 2e, that is, the transmission filter 2g. The light beams from the plurality of point light sources formed in the back-side focal plane of the second fly eye lens 2e are further incident upon the second optical condenser system 2f.

The first fly eye lens 2c and first optical condenser system 2d constitute a first homogenizer, and homogenize an incidence angle on the phase shift mask 1. Similarly, the second fly eye lens 2e and second condenser optical system 2f constitute a second homogenizer, and homogenize light intensities of laser beams incident upon the phase shift mask 1. Therefore, the first and second homogenizers change the light beam transmitted from the light source 2a into light beam which has substantially homogeneous light intensity distribution.

As shown in FIG. 2, the transmission filter 2g includes a circular middle region 12a which has a transmittance, for example, of 50% with respect to a wavelength of the light emitted from the light source 2a, and an annular peripheral region 12b which is formed so as to surround the middle region 12a and whose transmittance is substantially 100%. Therefore, in an illumination pupil plane or in the vicinity of the plane, the light intensity of a part of the light beam transmitted through the middle region 12a is relatively low, and the light intensity of a part of the light beam transmitted through the peripheral region 12b is relatively high. Therefore, the optical illumination system 2 emits the light beam having an incidence angle light intensity distribution which is homogeneous in an irradiated plane but which is low in a middle rather in a periphery in a superimposing manner (FIG. 2).

The middle region 12a of the transmission filter 2g is obtained by forming a chromium film (or a ZrSiO film) having a thickness, for example, in accordance with transmittance on a transparent substrate by a sputter process, and patterning the film of the peripheral region to etch/remove the film. Chromium which is a shield material reflects a part of light and absorbs a part of light. Moreover, the middle region 12a may also be obtained by forming a multilayered film designed so as to partially reflect the light having a use wavelength emitted from the light source 2a on the transparent substrate, and thereafter pattern the film. That is, the middle region 12a is obtained by forming a reflective film on the substrate transparent to the use wavelength, such as annular quartz glass, and etching a portion of the reflective film of the peripheral region 12b.

When the multilayered film is used as a reflective material, there is an advantage that heat is not generated by absorption of any unnecessary light. However, it needs to be considered that a reflected light should not form a stray light to cause flare. Types and thicknesses of the shield and reflective materials are preferably adjusted so that a phase difference is not substantially generated in the transmitted light in a boundary line between the middle region 12a and peripheral region 12b. In the first embodiment, an example of the middle region 12a which is formed in a circular shape has been described, but other shapes such as triangular and rectangular shapes may also be formed.

Figure 3A:
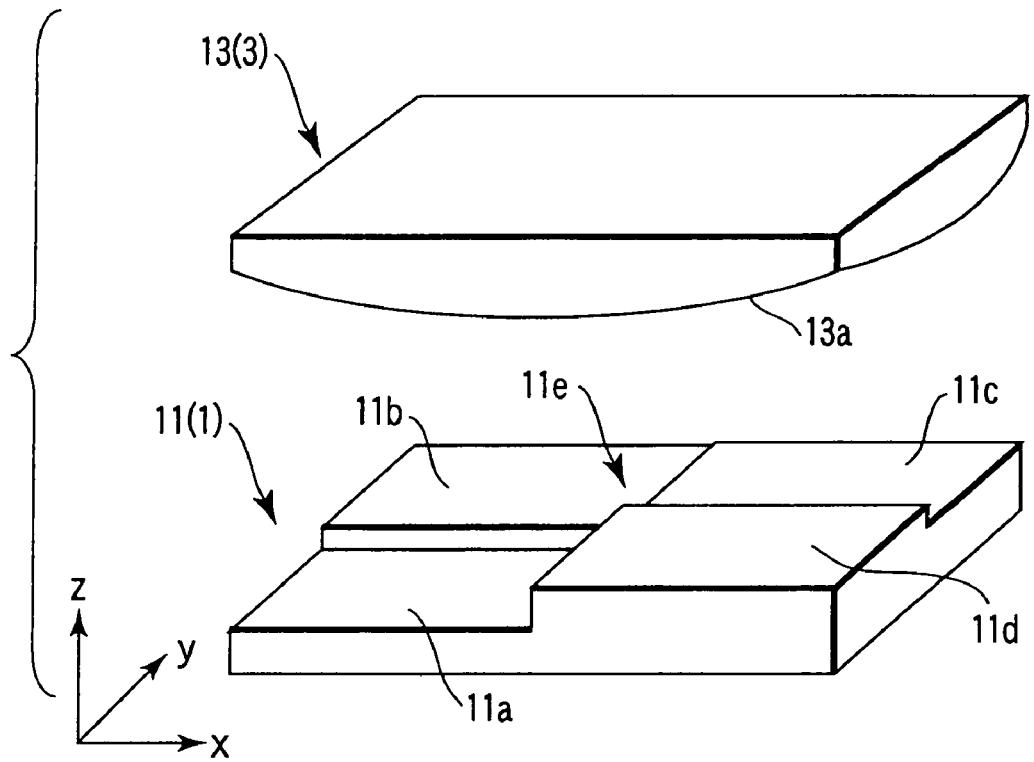
FIG. 3A is a perspective view showing basic unit portions of a phase shift mask and wavefront dividing element.
Figure 3B:
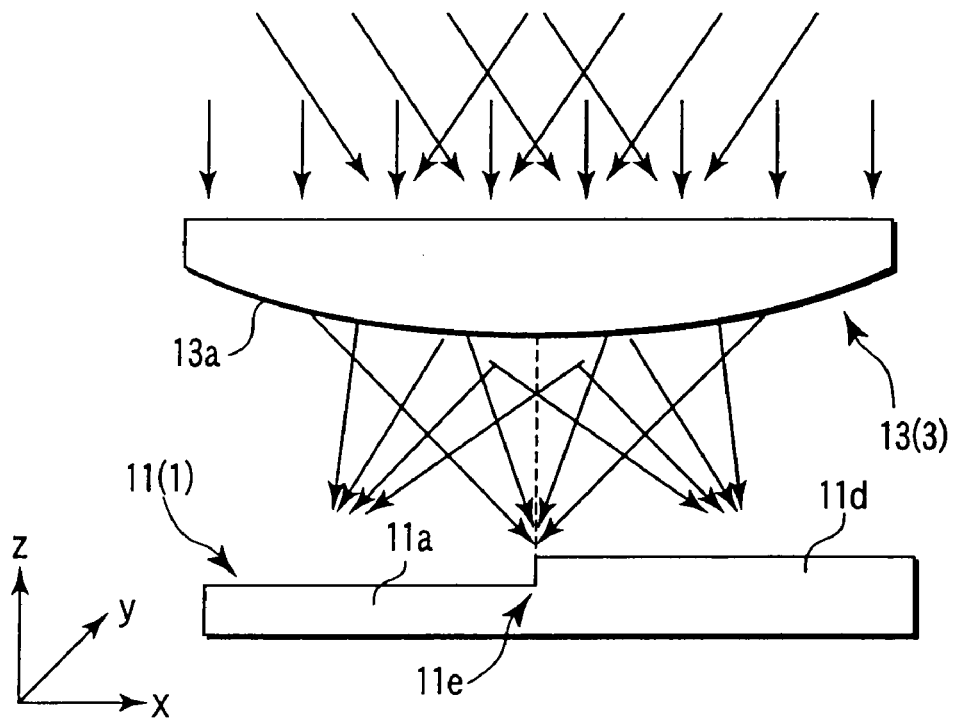
FIG. 3B is a side view showing a condensed state of an incident light of a micro lens array 3.

FIG. 3A is a perspective view schematically showing one of a large number of basic unit portions constituting the phase shift mask 1 in association with one of a large number of basic unit portions consisting of a convergence/divergence device including the micro lens array 3, that is, a wavefront dividing element. FIG. 3B is a side view showing the basic unit portions of the phase shift mask and micro lens array, and is a diagram showing a condensed state of an incident light of the micro lens array 3.

As shown in FIG. 3A, a micro lens element (optical element) 13 which is the basic unit portion of the micro lens array 3 includes a refractive surface 13a having a two-dimensional curved surface shape such as a partially spherical shape which projects on a phase shift mask 1 side. By this refractive surface 13a, the micro lens element 13 of the micro lens array 3 has a two-dimensional condensing function along x and y directions as shown in FIG. 3B. That is, the light condensed from the optical illumination system 2 by a large number of convex lenses is incident upon each micro lens element 13. A state of each micro lens element 13 which emits a large number of condensed beams (or parts of the beam) is shown in FIG. 3B. As a result, an inverse peak pattern can be obtained without being influenced by surges described later in detail.

As shown in FIG. 3A, a basic unit portion 11 of the phase shift mask 1 has substantially the same size in the x and y directions as that of the micro lens element 13 of the micro lens array 3, and is disposed in the x-direction, in parallel with the micro lens element 13, and in the vicinity of the element in a z-direction (light direction). The basic unit portion 11 of the phase shift mask 1 includes four rectangular phase shift surfaces including first to fourth regions 11a to 11d. The first and third regions 11a and 11c, and the second and fourth regions 11b and 11d are diagonally positioned, respectively. Two diagonally positioned regions give a phase difference of $\pi$ between the transmitted light beams. That is, the phase shift mask 1 has a staircase shape stepped so that the first to fourth regions 11a to 11d successively have a mutual difference of $\pi/2$. The regions 11a to 11d including the steps may be formed by etching or depositing.

Concretely, for example, the phase shift mask 1 is formed by etching quartz glass having a refractive index of 1.5 with respect to the light beam which has a wavelength of 248 nm. In this case, a step of 124 nm is given between the first and second regions 11a and 11b (thickness difference between the first and second regions of quartz glass). A step of 248 nm is given between the first and third regions 11a and 11c (thickness difference between the first and third regions of quartz glass). A step of 372 nm is given between the first and fourth regions 11a and 11d (thickness difference between the first and fourth regions of quartz glass). A phase shift portion 11e is formed in the vicinity of intersections of four phase shift lines which are boundary lines of the respective regions 11a to 11d. In the phase shift lines of the phase shift mask, the light passed through the second region 11b is late in phase behind the light passed through the first region 11a. Similarly, the lights passed through the third and fourth regions 11c and 11d also falls behind the light passed through the second and third regions 11b and 11c by $\pi/2$ phase, respectively. As a result, interference and diffraction occur in the light passed through the regions 11a to 11d. In this manner, a portion disposed opposite to the phase shift portion 11e in which the phase shift lines intersect with each other indicates zero or nearly zero, and therefore the light intensity distribution indicates an inverse peak pattern.

The micro lens array 3 and phase shift mask 1 are positioned so that a center of the refractive surface 13a is aligned with the phase shift portion 11e on the optical axis. For example, as shown in FIG. 4, the phase shift mask 1 is constituted by orderly arranging a plurality of basic unit portions 11 in two dimensions, that is, in a matrix shape of 2×2. In the same manner as the phase shift mask 1, the micro lens array 3 is constituted by orderly arranging a large number of micro lens elements 13 two-dimensionally (lengthwise and breadthwise and densely).

The basic unit portion 11 of the phase shift mask 1 shown in FIG. 4 according to the first embodiment includes four regions, but may include two regions which give a phase difference of $\pi$ to the transmitted light beams. When the phase shift mask 1 includes two regions in each unit portion 11, these regions are alternately disposed in a stripe shape. The phase difference can be formed by changing the thickness of the part or parts of a quartz glass plate. The thickness can be formed by etching.

The light beam which is emitted from the optical illumination system 2 and which has a substantially homogeneous light intensity distribution is transmitted through the micro lens array 3 to irradiate the phase shift mask 1. The parts of the light beam incident upon the respective micro lens elements 13 of the micro lens array 3 pass through the refractive surface 13a, undergo the condensing function, and are incident upon a focal position of the micro lens element 13 or the phase shift portion 11e of the phase shift mask 1 disposed in the vicinity of the focal position in a spotted form. In this manner, the micro lens array 3 constitutes a wavefront dividing element which is disposed on a light path between the optical illumination system 2 and phase shift mask 1 and which wavefront-divides the light beam incident from the optical illumination system 2 into a plurality of light beams or light beam portions. The wavefront-divided light beams are focused in the phase shift portion 11e disposed in the focal position, or in the vicinity of the portion.

FIG. 5 is a diagram showing the light intensity distribution of a laser light incident upon the phase shift mask 1 by both functions of the transmission filter 2g and micro lens array 3. For the light beam transmitted through the micro lens array 3 via the transmission filter 2g which has the property shown in FIG. 2, an obliquely outgoing part of the light beam is more intense than a vertically outgoing part of the light beam. Therefore, as shown in FIG. 5, the light beam has an upward concave light intensity distribution of the laser beam on the phase shift mask 1, in which the light intensity is minimum in each phase shift portion 11e shown in FIG. 3B and increases as a distance from the phase shift portion 11e increases. Concretely, in the upward concave light intensity distribution of the laser beam, the light intensity is lowest in a position disposed opposite to the center of the refractive surface 13a of the micro lens array 3 shown in FIG. 3A, and the light intensity of the laser beam is continuously highest in an annular position around this point.

The upward concave light intensity distribution of the laser beams has a similar profile both in the x and y-directions. Moreover, a width of the upward concave light intensity distribution of the laser beam is preferably set to be equal to a pixel pitch of a liquid crystal display, when this technique is applied to a manufacturing process of an image display circuit of the liquid crystal display. The crystal grain diameter equal to the pixel pitch is an area in which a thin film transistor circuit for switching one pixel can be formed.

Figure 6:
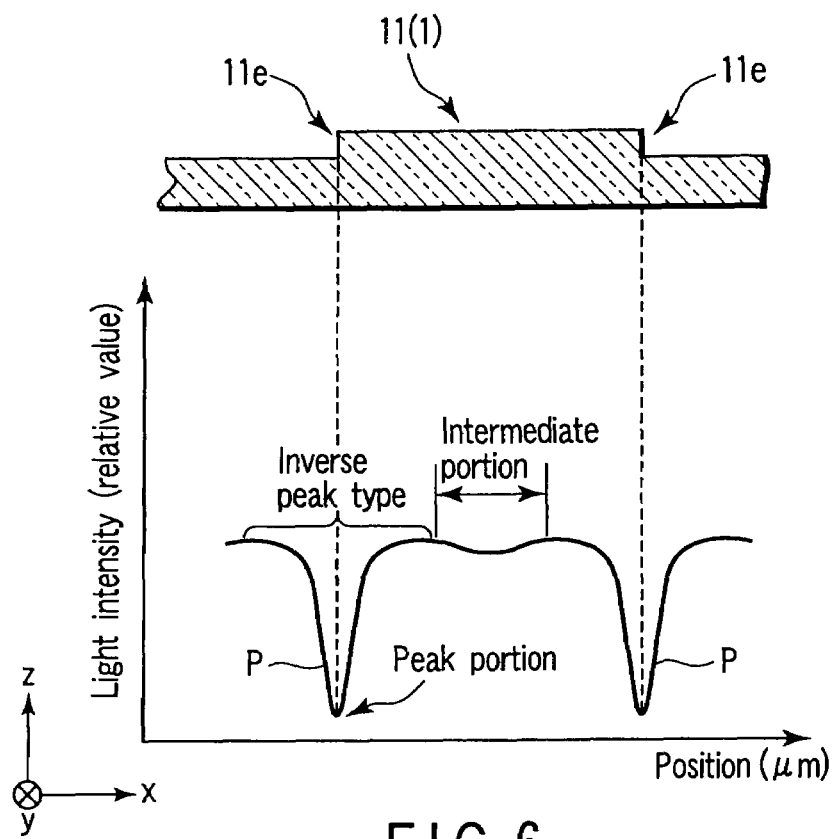
FIG. 6 is an explanatory view of a function of the phase shift mask.

The light beam with which the phase shift mask 1 is irradiated in a spot shape is phase-modulated and incident upon the semiconductor film of the substrate to be treated 4 disposed in parallel with and in the vicinity of the phase shift mask 1. FIG. 6 is an explanatory view of a function of the phase shift mask 1. A basic function of the phase shift mask 1 having two elongated regions in each unit will be described hereinafter in a case in which the micro lens array 3 is not disposed on the light path between the optical illumination system 2 and phase shift mask 1.

Since the phase difference between two adjacent elongated regions is set to $\pi/2$ in the phase shift mask 1, the light intensity decreases but does not turn to zero in positions corresponding to the phase shift lines other than the intersections. On the other hand, since an integral value of a complex transmittance of a circular region around the intersection of the phase shift lines is set to zero, the light intensity is substantially zero in the position corresponding to the intersection, that is, the phase shift portion 11e.

Therefore, for the light intensity distribution of the laser beams transmitted through the respective basic unit portions 11 of the phase shift mask 1, as shown in FIG. 6, on the semiconductor film of the substrate to be treated 4, an inverse peak type light intensity distribution pattern P is obtained. In the pattern, the light intensity is substantially zero in the point corresponding to each phase shift portion 11e of the phase shift mask 1, and the light intensity continuously rapidly increases as the distance from the phase shift portion 11e increases. Therefore, the light beam passed through the phase shift mask 1 including a plurality of phase shift portions 11e arranged in the matrix shape entirely periodically has the inverse peak type light intensity distribution. This periodical inverse peak type light intensity distribution has substantially the same profile in the x and y-directions. The width of the inverse peak type light intensity distribution changes in proportion to ½ square of a distance between the phase shift mask 1 and the semiconductor film of the substrate to be treated 4 (i.e., a defocus amount).

As described above, when the semiconductor film is irradiated with the light beams periodically having the inverse peak type light intensity distribution only as shown in FIG. 6, lateral growth started toward periphery from a crystal nucleus stops in a swell portion of a waveform in an intermediate portion between the inverse peak type patterns P disposed adjacent to each other. In the first embodiment, to realize sufficient lateral growth from the crystal nucleus, the transmission filter 2g is disposed in an illumination pupil plane of the optical illumination system 2, or in the vicinity of the plane.

Figure 7:
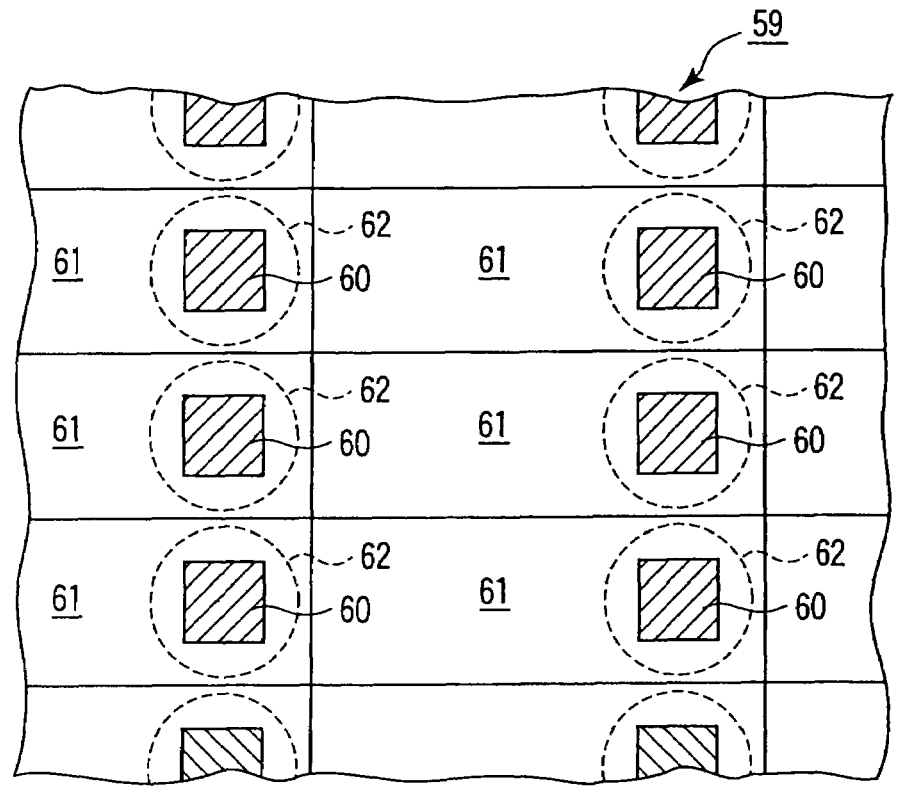
FIG. 7 is a diagram showing a transistor forming region which is disposed in each pixel region and which needs to be crystallized in a liquid crystal display.

FIG. 7 is a diagram schematically showing transistor forming regions 60 which are disposed in pixel regions 61 and which need to be crystallized in a liquid crystal display 59. Referring to FIG. 7, for example, when the liquid crystal display 59 is manufactured as described above, the light beam from the phase shift mask 1 is emitted also to the outside of spotted light beam region 62, and therefore a light amount loss is very large. In the first embodiment, the micro lens array 3 is disposed on the light path between the optical illumination system 2 and phase shift mask 1 in order to efficiently irradiate the transistor forming region 60 only with the light beam from the optical illumination system 2.

FIG. 8A is a diagram showing the light intensity distribution obtained on the semiconductor film of the substrate to be treated 4 by cooperative functions of the transmission filter 2g, micro lens array 3, and phase shift mask 1. As described above, the transmission filter 2g, micro lens array 3, and phase shift mask 1 have a function of forming the light beam having the light intensity distribution in which the light intensity of the light beams having the homogeneous light intensity distribution is minimized in the center, and decreased, for example, by 50%. The light intensity substantially linearly increases in a steep gradient toward the periphery in the inverse peak type, and further linearly increases in a little gentle gradient. As shown in FIG. 8B, the micro lens array 3 has a function of converting the incident light beam into the spotted light beams with which the predetermined region only is irradiated in the inverse peak pattern P of FIG. 6. The phase shift mask 1 has a function of converting the light beam having the homogeneous light intensity distribution into the light having the inverse peak type light intensity distribution shown in FIG. 6.

Since the crystallization apparatus according to the first embodiment includes the phase shift mask 1, transmission filter 2g, and micro lens array 3, the light beam reaching the substrate to be treated 4 undergo the functions of these three members as shown in FIG. 8B. Therefore, the light beam reaching the amorphous semiconductor film of the substrate to be treated 4 is converted into the spotted light beams which illuminate the predetermined region only. As shown in FIG. 8A, a two-steps inverse peak type light intensity distribution is obtained as represented by a product with the concave light intensity distribution on the inverse peak type light intensity distribution distributed in the same period. In this two-steps inverse peak type light intensity distribution, to follow the above-described inverse peak type light intensity distribution, the light intensity is substantially zero in the point corresponding to the phase shift portion 11e, and the light intensity rapidly increases apart from this point to reach a predetermined value. That is, a position of the two-steps inverse peak type light intensity distribution in which the light intensity is minimized is determined by the position of the phase shift portion 11e.

Figure 9:
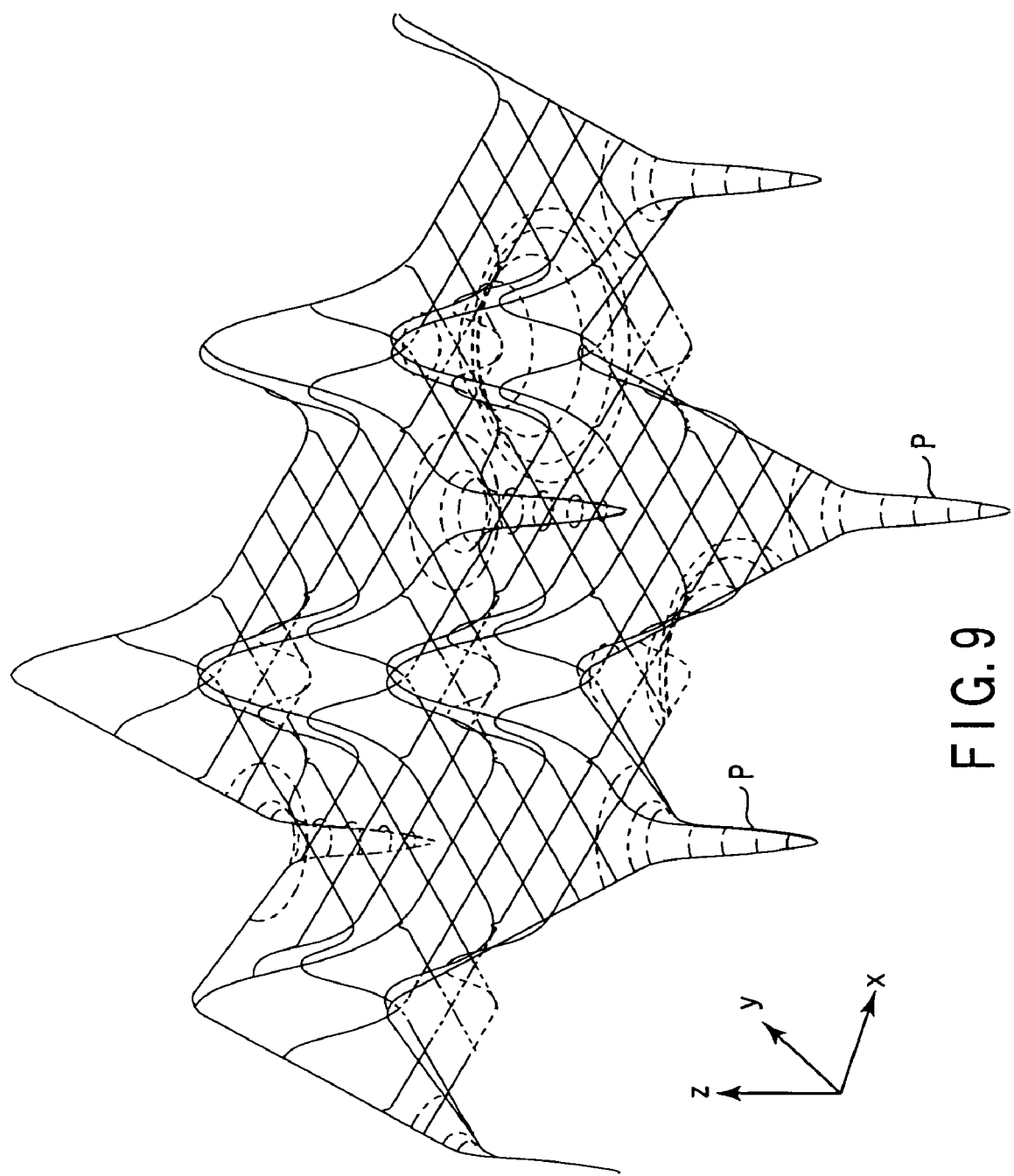
FIG. 9 is a diagram three-dimensionally showing the light intensity distribution shown in FIG. 8A.

In the first embodiment, the two-steps inverse peak type light intensity distribution corresponds to the above-described periodical upward concave light intensity distributions of the x and y-directions. As shown in FIG. 9, in the light intensity distribution between the inverse peak portions disposed adjacent to each other, the light intensity substantially monotonously increases along the x and y-directions. The waveform pattern of the two-steps inverse peak type light intensity distribution shown in FIG. 8A is a waveform pattern obtained by superimposing the waveform pattern of the light intensity distribution of a linearly rising concave portion shown in FIG. 5 upon the waveform pattern of the light intensity distribution of the inverse peak portion shown in FIG. 6. There are inflection points in which inclinations are reduced in boundaries H between substantially linearly increasing intensities.

When the semiconductor film of the substrate to be treated 4 is irradiated with the light beam having the two-steps inverse peak type light intensity distribution, a crystal nucleus is formed in a portion corresponding to the point indicating the minimum light intensity, that is, substantially zero light intensity (point corresponding to the phase shift portion 11e). This will be described in detail. There is a phenomenon in which crystal growth is started at a certain or more light intensity. This light intensity is designed so as to be inside the inverse peak type pattern. Then, the crystal nucleus can be defined inside the inverse peak type light intensity distribution. That is, a polycrystal is generated in a center portion of the inverse peak portion, and thereafter the crystals outside the generated polycrystal form nuclei and grow in a horizontal direction.

For irradiation with the laser beam which has the light intensity distribution including the inverse peak pattern, lateral growth is started from the crystal nucleus along the x and y-directions including a large light intensity gradient (i.e., temperature gradient). In the two-steps inverse peak type light intensity distribution, a portion in which the light intensity decreases does not substantially exist in the intermediate portion. Therefore, the lateral growth reaches its peak without stopping halfway, and the growth of a larger crystal grain can be realized. Especially in the first embodiment, the inflection point in which the inclination is reduced exists between the inverse peak portion and the upward concave portion. Therefore, the crystal nucleus can be limited inside the inverse peak. Therefore, when the semiconductor film of the substrate to be treated 4 is irradiated with the light beam having the two-steps inverse peak type light intensity distribution, the film is crystallized in a broad region over the width from the center portion of the two-steps inverse peak type light intensity distribution. When the width of the two-steps inverse peak type light intensity distribution is set to be equal to the pixel pitch of the liquid crystal display, the single crystal can be generated with respect to each pixel. In other words, the semiconductor film forming each pixel driving circuit of a matrix circuit substrate of the liquid crystal display or EL display can be mono-crystallized.

As described above, in the first embodiment, sufficient lateral growth from the crystal nucleus is realized, and the crystallized semiconductor film having a large grain size can be produced. The crystal produced by the crystallization apparatus according to the first embodiment has a large grain size, and has a higher electron mobility especially in the directions (x and y-directions) of the lateral growth. Therefore, when a source and drain of the transistor are arranged in the direction of the lateral growth, the transistor having a satisfactory property can be manufactured.

In the first embodiment, the light incident upon the micro lens array 3 is wavefront-divided by a large number of micro lens elements 13, the light beam is condensed via the respective micro lens elements 13, and the vicinity of the corresponding phase shift portion 11e is irradiated in a spot shape. The part of light beam transmitted in the vicinity of the phase shift portion 11e form the spotted light beam region 62 to surround the transistor forming region 60. Therefore, a large part of the light supplied from the optical illumination system 2 can contribute to the crystallization only of the desired transistor forming region 60, and the crystallization satisfactory in light efficiency can be realized.

In the first embodiment, as shown in FIG. 3B, the refractive surface 13a of the micro lens element 13 of the micro lens array 3 is a partially spherical, but may also have another curved shape having different curvatures in the x and y-directions. When the curvature of the x-direction of the refractive surface 13a is different from that of the y-direction, the spotted light beam region has an elliptic shape. Long and short axes of the elliptic shape correspond to the widths of the two-steps inverse peak type light intensity distribution in the x and y-directions. Therefore, when the spotted light beam region is formed in the elliptic shape, the gradient of the light intensity in the inverse peak portion differs with the x and y-directions. Therefore, when the curvature of the refractive surface 13a is set to be arbitrary, a degree of lateral growth can be changed along each direction.

In the first embodiment, assuming that a numerical aperture of the optical illumination system 2 is NA1, a focal distance of the micro lens array 3 (i.e., the focal distance of each micro lens element 13) is f, the numerical aperture of the micro lens array 3 (i.e., the numerical aperture of each micro lens element 13) is NA2, and the wavelength of an illuminative light is $\lambda$, the micro lens array 3 preferably satisfies the following condition equation (1).

$$R2 = k\lambda/NA2 < f \times NA1 \qquad (1),$$

where the right side indicates a value corresponding to a size (radius) of the spotted light beam region formed in the phase shift portion 11e, and the left side indicates a value corresponding to a resolution R2 of the micro lens array 3. A constant k indicates a value substantially close to 1, depending on specifications of the optical illumination system 2 for illuminating the phase shift mask 1, or definitions of the degree and resolutions of coherence of the light beam supplied from the light source, and therefore the constant is ignored here. When the condition equation (1) is satisfied, the upward concave light intensity distribution of the laser beams can clearly be formed as shown in FIG. 5. Therefore, the two-steps inverse peak type light intensity distribution can clearly be formed as shown in FIGS. 8A, 8B, and 9.

In the first embodiment, simulation concerning the condition equation (1) is performed in accordance with usual design conditions. In this simulation, the pitch (size) D of each micro lens element 13 of the micro lens array 3 is set to 100 μm, the focal distance f is set to 500 μm, and the numerical aperture NA1 of the optical illumination system 2 is set to 0.02. In this case, the numerical aperture of the micro lens array 3, that is, the numerical aperture NA2 of each micro lens element 13 is approximated by the following equation (a).

$$NA2 \approx D/f = 100/500 = 0.2 \qquad (a)$$

Therefore, the left and right sides of the condition equation (1) are represented by the following equations (b) and (c).

$$R2 = \lambda/NA2 \approx 0.248/0.2 \approx 1.2 \text{ μm} \qquad (b)$$

$$f \times NA1 = 500 \times 0.02 = 10 \text{ μm} \qquad (c)$$

Therefore, the resolution R2 is 1.2 μm, and sufficiently small with respect to a radius of 10 μm of the spotted light beam region 62 which surrounds each transistor forming region 60. It is therefore seen that the two-steps inverse peak type light intensity distribution can clearly be formed as shown in FIGS. 8A, 8B, and 9.

Figure 10:
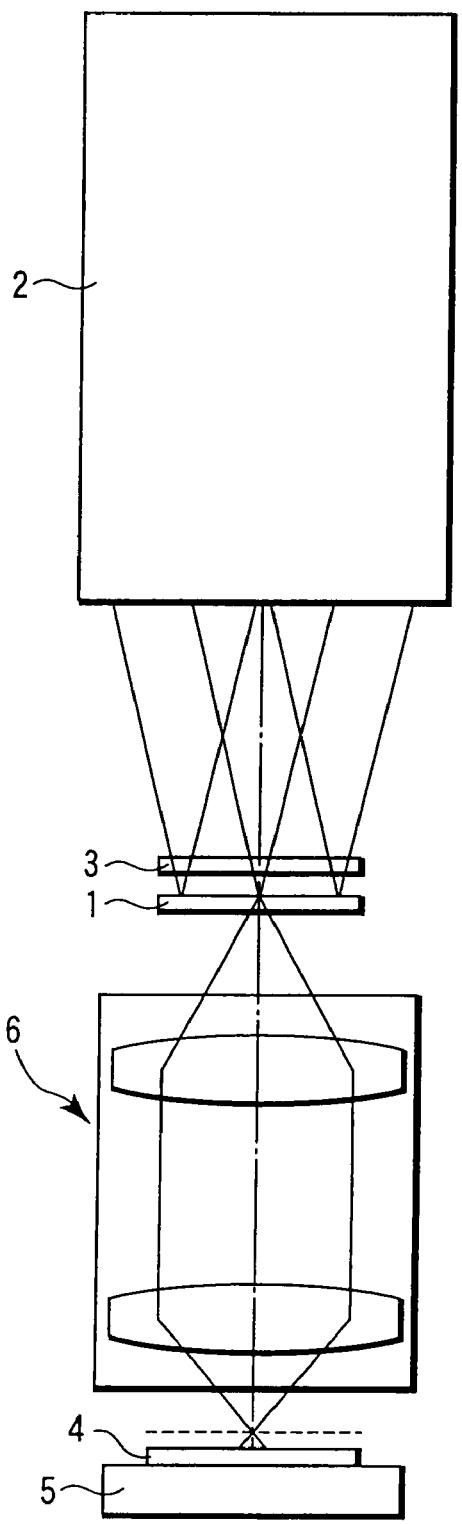
FIG. 10 is a diagram schematically showing a crystallization apparatus according to a second embodiment of the present invention.

FIG. 10 is a diagram schematically showing the constitution of the crystallization apparatus according to a second embodiment of the present invention. The second embodiment includes a constitution similar to that of the first embodiment, but is different from the first embodiment in that the phase shift mask 1 is disposed apart from the substrate to be treated 4 and an optical image forming system 6 is disposed on a light path between the mask and substrate. The second embodiment will be described hereinafter with respect to different respects from the first embodiment. For the sake of clarification of the drawing, in FIG. 10, the inner constitution of the optical illumination system 2 is omitted, the same components as those of FIGS. 1 to 9 are denoted with the same reference numerals, and detailed description is redundant and is therefore omitted.

In the second embodiment, the substrate to be treated 4 is distant from a plane optically conjugated with the phase shift mask 1 (image plane of the optical image forming system 6) along the optical axis. In this case, the width of the inverse peak type light intensity distribution of the laser beam formed into an image on the semiconductor film of the substrate to be treated 4 by the function of the phase shift mask 1 changes substantially in proportion to ½ square of the distance between the image plane of the optical image forming system 6 and the substrate to be treated 4 (i.e., a defocus amount), assuming that the resolution of the optical image forming system 6 is sufficient. It is to be noted that the optical image forming system 6 may be any of refractive, reflective and refractive/reflective optical systems.

Also in the second embodiment, in the same manner as in the first embodiment, the semiconductor film of the substrate to be treated 4 is irradiated with the light beam which has the two-steps inverse peak type light intensity distribution by the functions of three members including the transmission filter 2g, micro lens array 3, and phase shift mask 1. Therefore, the lateral growth from the crystal nucleus reaches the peak without stopping halfway, and the large-grain-size crystallized semiconductor film can be produced. Most of the light beam supplied from the optical illumination system 2 by the cooperative function of the micro lens array 3 and phase shift mask 1 can contribute to the crystallization of the desired region, and the crystallization satisfactory in the light efficiency can be realized.

Moreover, in the second embodiment, the optical image forming system 6 is optically interposed between the phase shift mask 1 and substrate to be treated 4, and a relatively large interval is secured between the substrate to be treated 4 and optical image forming system 6. Therefore, when the light beam is incident upon the semiconductor film of the substrate to be treated 4, abraded portions generated from the semiconductor film are prevented from adhering to the phase shift mask 1 or contaminating the mask. Therefore, satisfactory crystallization can be realized without being influenced by abrasion in the substrate to be treated 4.

Furthermore, in the second embodiment, since a relatively large interval is secured between the substrate to be treated 4 and optical image forming system 6, a detection light for detecting the position is introduced onto the light path between the substrate to be treated 4 and optical image forming system 6, and a positional relation between the substrate to be treated 4 and optical image forming system 6 is easily adjusted.

Figure 11:
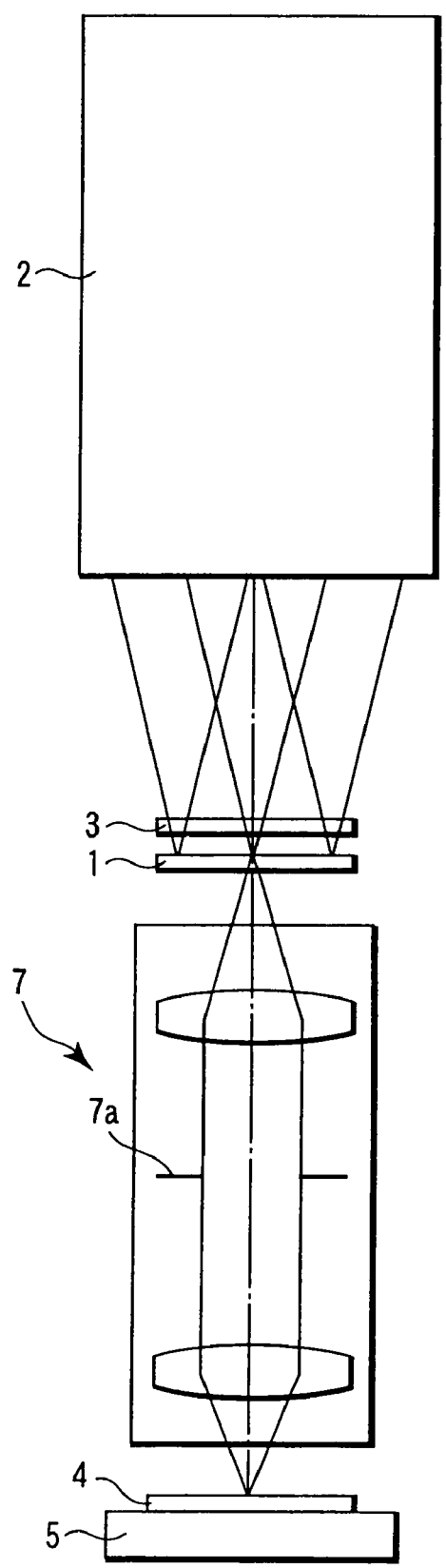
FIG. 11 is a diagram schematically showing the crystallization apparatus according to a third embodiment of the present invention.

FIG. 11 is a diagram schematically showing the constitution of the crystallization apparatus according to a third embodiment of the present invention. The third embodiment includes the constitution similar to that of the second embodiment, but is different from the second embodiment in that a pattern forming surface of the phase shift mask 1 and the substrate to be treated 4 are disposed so as to have an optically conjugated relation via an optical image forming system 7.

The third embodiment will be described hereinafter with respect to the different respects from the second embodiment. It is to be noted that for the sake of clarification of the drawing, in FIG. 11, the inner constitution of the optical illumination system 2 is omitted.

The optical image forming system 7 according to the third embodiment includes an aperture diaphragm 7a. The aperture diaphragm 7a is selected from a plurality of aperture diaphragms different in the size of an aperture (light transmission portion). These aperture diaphragms are constituted so that the diaphragms can selectively be converted with respect to the light path. Instead, the aperture diaphragm 7a may also be constituted such that the size of the aperture continuously changes, for example by moving the diaphragm. The size of the aperture of the aperture diaphragm 7a (i.e., the image-side numerical aperture of the optical image forming system 7) is set such that the light beam can include the periodic two-steps inverse peak type light intensity distribution on the semiconductor film of the substrate to be treated 4. The width of the two-steps inverse peak type light intensity distribution is preferably set to be equal to the pixel pitch of a liquid crystal display.

By the function of the phase shift mask 1, the width of the inverse peak type light intensity distribution formed on the semiconductor film of the substrate to be treated 4 is of the same degree as that of a resolution R3 of the optical image forming system 7. The resolution R3 of the optical image forming system 7 is defined by R3=k$\lambda$/NA3, where $\lambda$ denotes the wavelength of a light for use, and NA3 denotes the image-side numerical aperture of the optical image forming system 7. Here, as described above, the constant k indicates a value substantially close to 1. When the image-side numerical aperture NA3 of the optical image forming system 7 is reduced, and the resolution of the optical image forming system 7 is lowered in this manner in the third embodiment, the width of the inverse peak type light intensity distribution increases.

That is, the inverse peak type pattern of the light intensity distribution of the light beam converted in a phase shift plane has an excessively small width on the phase shift plane. However, when the resolution is appropriately lowered, a preferable width is obtained. In the third embodiment, the image is formed on the semiconductor film of the substrate to be treated 4 with a low resolution by the optical image forming system 7 with respect to the light intensity distribution on the phase shift plane. Therefore, the inverse peak portion of the light intensity distribution of the light beam with which the semiconductor film is irradiated has a preferable width on the semiconductor film of the substrate to be treated 4.

Also in the third embodiment, in the same manner as in the first and second embodiments, the semiconductor film of the substrate to be treated 4 is irradiated with the light beams which have the two-steps inverse peak type light intensity distribution. Therefore, the lateral growth from the crystal nucleus reaches the peak without stopping halfway, and the large-grain-size crystallized semiconductor film can be produced. The desired region only can be irradiated with most of the light beams supplied from the optical illumination system 2, and the crystallization satisfactory in the light efficiency can be realized. Also in the third embodiment, in the same manner as in the second embodiment, the satisfactory crystallization can be realized without being influenced by the abrasion in the semiconductor film of the substrate to be treated 4. Furthermore, it is easy to adjust the positional relation between the substrate to be treated 4 and optical image forming system 7.

In the second and third embodiments, it is preferable to satisfy the following condition equation (2) in addition to the above condition equation (1). It is to be noted that in the condition equation (2), NA3 denotes the image-side numerical aperture of the optical image forming system (6, 7) as described above.

$$\lambda/NA3 < f \times NA1 \quad (2),$$

where the right side indicates the value corresponding to the size (radius) of the spotted light beam region formed in the phase shift portion 11e, and the left side indicates the value corresponding to the resolution R3 of the optical image forming system (6, 7).

Figure 12:
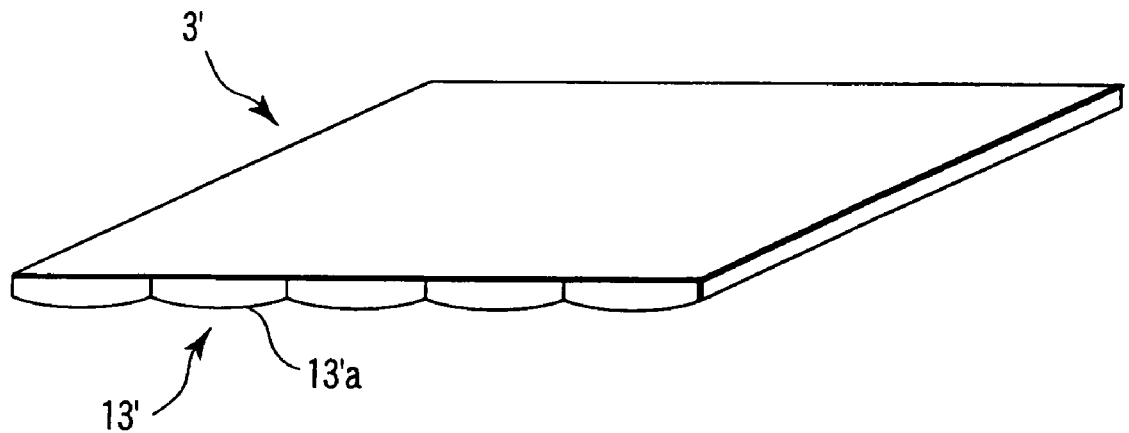
FIG. 12 is a diagram showing a micro cylindrical lens array according to a modification example of a wavefront dividing element.

Next, modification examples of the wavefront dividing element and transmission filter will be described with reference to FIGS. 12 to 14. In the present modification example, the wavefront dividing element is a micro cylindrical lens array 3' shown in FIG. 12. The micro cylindrical lens array 3' includes a plurality of optical elements 13' which extend in a predetermined direction (x-direction in the present example) and which are arranged in parallel with one another one-dimensionally along a direction crossing at right angles to the above direction (y-direction). Each of the optical elements 13' includes a refractive surface 13'a which has a one-dimensional condensing function in the y-direction.

Figure 13:
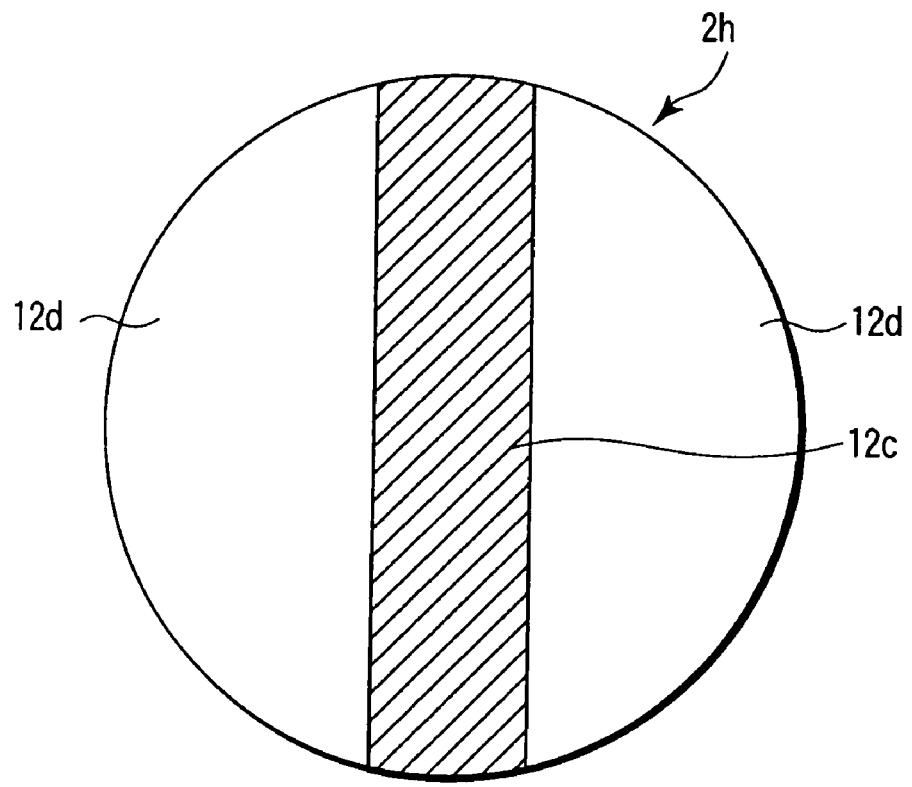
FIG. 13 is a diagram showing a modification example of the transmission filter.
Figure 14:
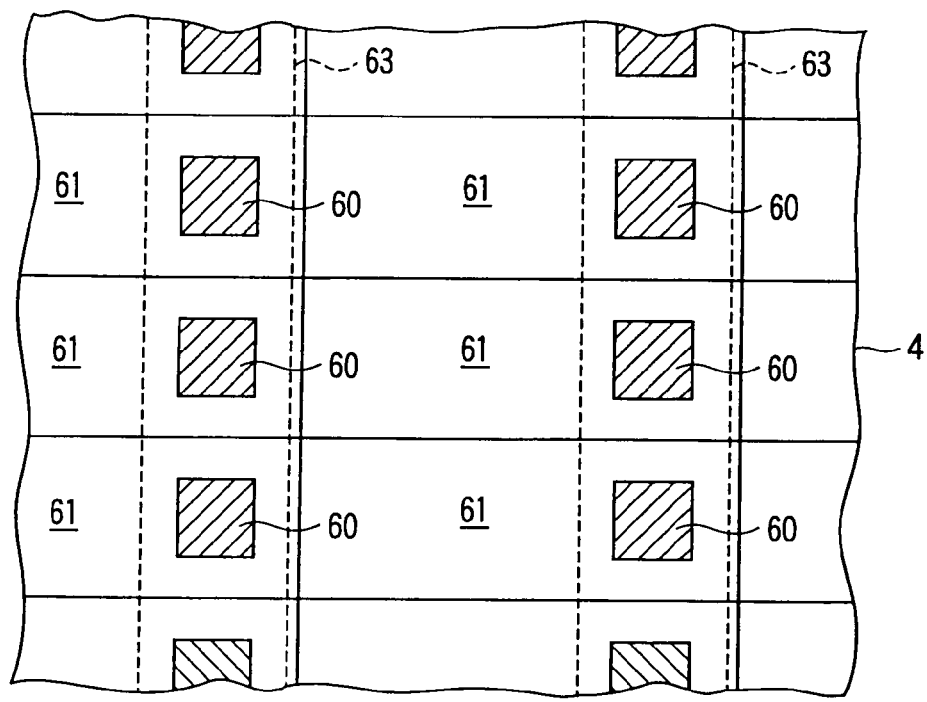
FIG. 14 is a diagram showing the transistor forming region which is disposed in each pixel region and which needs to be crystallized in the liquid crystal display.

In the present example, for the micro cylindrical lens array 3', it is preferable to use a transmission filter 2h shown in FIG. 13, instead of the transmission filter 2g. The transmission filter 2h includes: an elongated rectangular middle region 12c extending in the x-direction and having a transmittance, for example, of 50%; and a pair of semicircular peripheral regions 12d which are formed to hold the middle region 12c and which substantially have a transmittance of 100%. A longitudinal direction (x-direction) of the middle region 12c of the transmission filter 2h is set to optically correspond to that of each micro cylindrical lens element 13' of the micro cylindrical lens array 3'. The middle region 12c is defined by a pair of substantially parallel chords, but is not limited to this, and another shape may also be formed.

The light beam incident upon the micro cylindrical lens array 3' is wavefront-divided by a large number of micro cylindrical lens elements 13', and the light beams condensed via the respective micro cylindrical lens elements 13' form slit-shaped (linear) light beams in the respective corresponding phase shift portions 11e. As shown in FIG. 14, the slit-shaped light beam form slit-shaped light beam region 63 shown by dot lines, which surround the plurality of transistor forming region 60 of transistor forming region column direction in the semiconductor film of the substrate to be treated 4.

Therefore, the light intensity distribution of the slit-shaped light beam with which the semiconductor film of the substrate to be treated 4 is irradiated has a two-steps inverse peak type profile along the short-side direction of the slit as shown in FIG. 8A, and has a uniform profile along the longitudinal direction. That is, the light beam transmitted through the micro cylindrical lens array 3' and transmission filter 2h to irradiate the semiconductor film of the substrate to be treated 4 obtains the light intensity distribution which is partially shown in FIG. 15.

Figure 15:
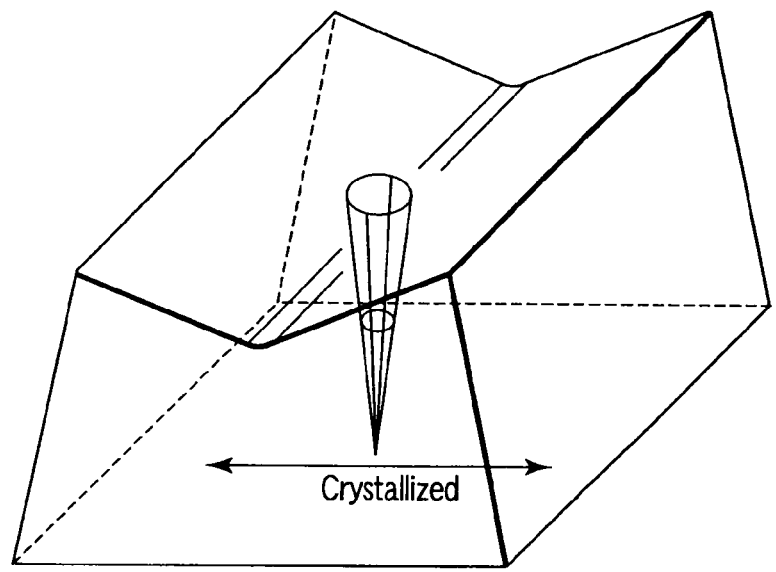
FIG. 15 is a diagram showing an light intensity distribution of the light beams transmitted through the transmission filter, micro cylindrical lens array, and phase shift mask according to the modification example.

When the semiconductor film of the substrate to be treated 4 is irradiated with the light beam having the two-steps inverse peak type light intensity distribution as shown in FIG. 15, the crystal nucleus is formed in a point in which the light intensity is minimized, that is, in a point substantially of zero. Next, the lateral growth is started along a direction having a light intensity gradient from this crystal nucleus (lateral direction in FIG. 13). In the two-steps inverse peak type light intensity distribution shown in FIG. 15, the portion in which the light intensity decreases does not substantially exist in the intermediate portion. Therefore, the lateral growth reaches the peak without stopping halfway from the crystal nucleus, and the growth of a large grain can be realized.

In the above-described embodiments and modification examples, the micro lens array 3 and micro cylindrical lens array 3' may have the refractive surface 13'a having a continuous curved shape, or a stepped refractive surface. The constitution is not limited to the continuous curved surface or the multiple-step approximation, and the wavefront dividing element may also be constituted as "quino form" folded back in a range of phase differences of 0 to $2\pi$. Furthermore, a wavefront dividing function can also be applied by a refractive index distribution of an optical material without disposing the refractive surface in the wavefront dividing element. For example, it is possible to use conventional arts such as photo polymer whose refractive index is modulated by the light intensity, and ion exchange of glass. A hologram or diffractive optical device may also be used to apply a function equivalent to that of the wavefront dividing element.

Figure 16:
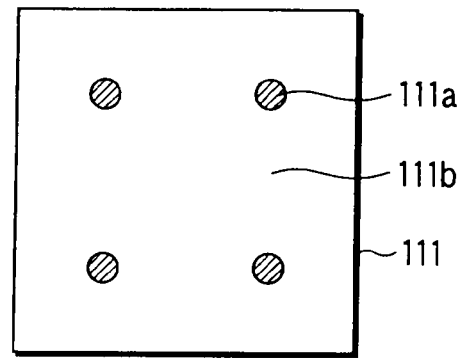
FIG. 16 is a diagram showing a modification example of the phase shift mask.

Furthermore, in the above-described embodiments, the phase shift mask 1 is constituted of four rectangular regions corresponding to phases of 0, $\pi/2$, $\pi$, $3\pi/2$, but the present invention is not limited to this, and the phase shift mask can variously be modified. For example, a phase shift mask may also be used which includes an intersection (phase shift portion) including three or more phase shift lines and in which the integral value of the complex transmittance of the circular region around the intersection is substantially zero. As shown in FIG. 16, a phase shift mask 111 may also be used in which circular concave portions corresponding to the phase shift portions, or convex portions 111a have steps from a periphery and which is set so as to have a phase difference of $\pi$ between the light beams transmitted through the circular portions and the light beams transmitted through a periphery 111b.

The light intensity distribution can also be calculated in a stage of design, but it is preferable to observe and confirm the light intensity distribution in an actual surface to be treated (surface to be exposed). This observation is performed, for example, by enlarging the surface to be treated by the optical system and disposing image pickup devices such as CCD in the surface to be treated to measure the light intensity distribution of the light beams incident upon the image pickup device. When the light for use is an ultraviolet ray, the optical system is restricted, and therefore a fluorescent plate may be disposed in the surface to be treated to convert the beam to a visible light.

Moreover, in the above-described embodiments, the wavefront dividing element (the micro lens array 3 or micro cylindrical lens array 3') and the phase shift mask 1 may be formed as individual optical members, but the present invention is not limited to this, and the wavefront dividing element 3 and phase shift mask 1 may also integrally be combined to form an integrated assembly. In this case, the wavefront dividing element 3 and phase shift mask 1 do not have to be positioned, respectively, when attached to the apparatus, and the wavefront dividing element 3 and phase shift mask 1 can be attached as one integrated optical member to the apparatus with good accuracy.

The integrally formed wavefront dividing element 3 and phase shift mask 1 preferably include an incident a plane on which the light beam is incident upon the wavefront dividing element 3, a boundary plane between the wavefront dividing element 3 and phase shift mask 1, and the phase shift portion of the phase shift mask 1 in order from an incidence direction of the light beam. In this manner, a constitution which does not include a layer structure of glass is disposed on the side of the substrate to be treated 4 rather than the phase shift portion. Accordingly, in each embodiment, the distance between the phase shift surface and the substrate to be treated 4 is sufficiently reduced, and the satisfactory crystallization can be performed.

Particularly, in the second and third embodiments which require high resolution for exactly forming the inverse peak type light intensity distribution, with the constitution which does not include the layer structure of glass on the side of the substrate to be treated 4 from the phase shift surface, generation of unnecessary aberration can be avoided. After the phase shift surface and wavefront dividing element are formed in one surface of each of two substrates, the formed surfaces are disposed opposite to each other at a predetermined distance, peripheral portions are fixed to each other, and the substrates may also integrally be formed in this manner.

Figure 17A:
FIGS. 17A to 17K are explanatory views of a method of integrally forming the micro lens array and phase shift mask.
Figure 17B:
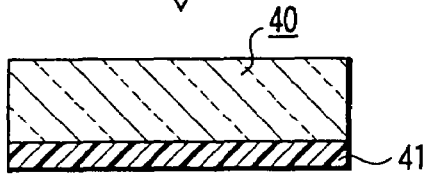
Figure 17C:
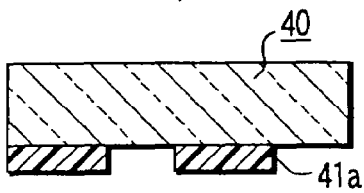
Figure 17D:
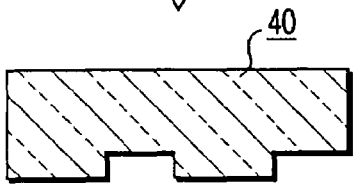
Figure 17E:
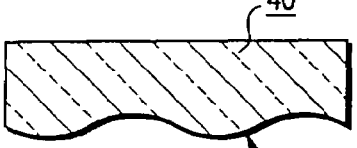
Figure 17F:
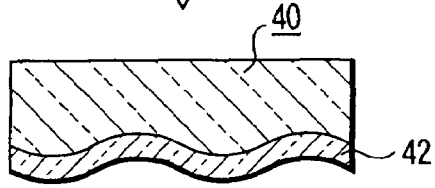
Figure 17G:
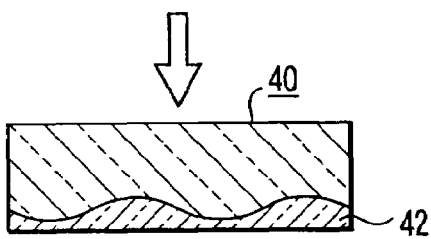

Next, one example of a method of manufacturing the integral assembly of the wavefront dividing element 3 and phase shift mask 1 will be described with respect to FIGS. 17A to 17K. FIGS. 17A to 17K are diagrams showing steps of the integral assembly of the wavefront dividing element 3 and phase shift mask 1. For example, one surface of a quartz substrate 40, having a refractive index of 1.50841, shown in FIG. 17A is entirely coated with a resist 41 as shown in FIG. 17B. Next, electron beam drawing and developing are performed to pattern the resist 41. Accordingly, a resist pattern 41*a* is formed on a predetermined position of the quartz substrate 40 as shown in FIG. 17C. Next, the resist pattern 41*a* is used as a mask to perform dry etching, and an exposed surface portion of the quartz substrate 40 is removed down to a predetermined depth. Furthermore, the resist is removed from the quartz substrate 40 as shown in FIG. 17D. Subsequently, the steps of applying and removing the resist are repeated, while the portion and depth of the quartz substrate 40 to be etched are successively shifted. Accordingly, a refractive surface (e.g., depth of 0.124 µm) 40*a* having a lens shape is entirely formed in the surface of the quartz substrate 40.

Figure 17H:
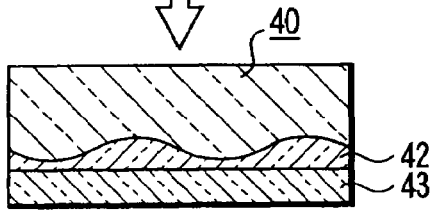
Figure 17I:
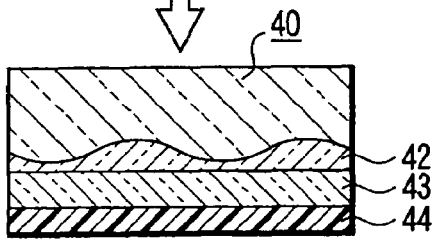

Subsequently, a transparent film 42 having a thickness of 3 µm formed of $Si_xN_y$ (high refractive index material), and for example, having a refractive index of about 2.3 is formed on the lens-shaped refractive surface 40*a* of the quartz substrate 40 by a CVD process. Moreover, for example, by a chemical mechanical polishing (CMP) technique, the surface of the transparent film 42 is flatted shown in FIG. 17G. Next, a transparent organic spin on glass (SOG) film (e.g., alkoxysilane substituted with an alkyl group) 43, for example, having a thickness of 40 µm is formed in the flatted surface of the transparent film 42 (FIG. 17H).

Figure 17J:
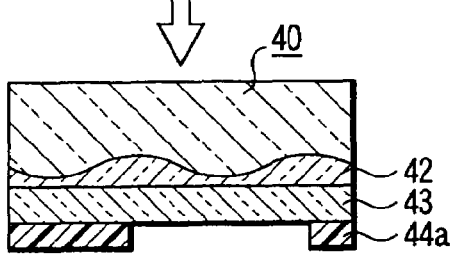
Figure 17K:
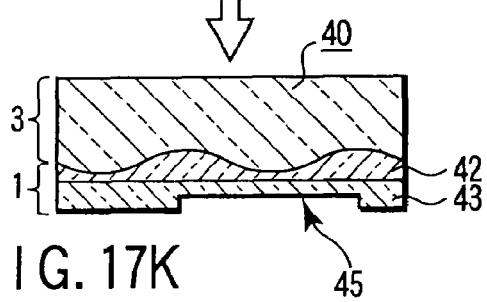

Furthermore, the whole surface of the organic SOG film 43 is coated with a resist 44 (FIG. 17I), the electron beam drawing and developing are performed with respect to the resist 44, and accordingly a resist pattern 44*a* is formed (FIG. 17J). Subsequently, the resist pattern 44*a* is used as the mask to perform the dry etching with respect to the exposed surface portion of the organic SOG film 43, a phase shift surface 45 having a depth, for example, of 0.248 µm is formed, and finally the resist is removed (FIG. 17K). In this manner, the quartz substrate 40 constituting the wavefront dividing element 3 is formed integrally with the transparent film 42 and organic SOG film 43 which constitute the phase shift mask 1. The lens-shaped refractive surface 40*a* constitutes an interface between the wavefront dividing element 3 and phase shift mask 1.

Figure 18A:
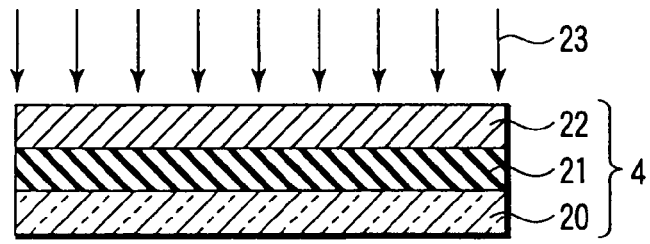
FIGS. 18A to 18E are diagrams showing a process of using the crystallization apparatus according to each embodiment to manufacture an electronic device.

FIGS. 18A to 18E show steps of using the crystallization apparatus of each embodiment to manufacture an electronic device. As shown in FIG. 18A, a chemical vapor phase growth process or sputter process is used to successively form an underlayer film 21 (e.g., a stacked film of SiN having a film thickness of 50 nm and $SiO_2$ stacked film having a film thickness of 100 nm) and an amorphous semiconductor film 22 (e.g., Si, Gc, SiGe, and the like having a film thickness of about 50 nm to 200 nm) on a transparent insulating substrate 20 (e.g., alkali glass, quartz glass, plastic, polyimide, and the like). Accordingly, the substrate to be treated 4 is prepared.

Figure 18B:
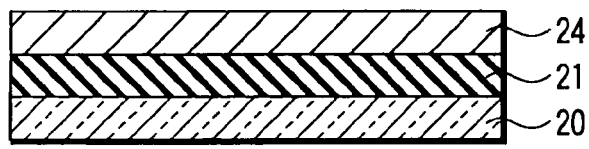

The crystallization apparatus is used to irradiate a part or whole of the surface of the formed amorphous semiconductor film 22 with laser beams 23 (e.g., KrF excimer laser beams or XeCl excimer laser beams). For the crystallization apparatus according to each embodiment of the present invention, the surface is irradiated with the light beams which have the two-steps inverse peak type light intensity distribution. Therefore, as shown in FIG. 18B, a polycrystalline semiconductor film or single-crystal semiconductor film 24 is produced which has crystals having large grain size as compared with the polycrystalline semiconductor film produced using the crystallization apparatus of the conventional art.

At this time, when the amorphous semiconductor film 22 has a relatively broad surface, and a part only of the surface is irradiated with one irradiation by the crystallization apparatus, the crystallization of the whole surface of the amorphous semiconductor film 22 is performed by relatively moving the crystallization apparatus and the amorphous semiconductor film 22 with respect to each other in two directions crossing at right angles to each other.

For example, the amorphous semiconductor film 22 is fixed, the crystallization apparatus scans the surface of the amorphous semiconductor film 22 in two directions crossing at right angles to each other (x, y-directions), and a part of the surface of the amorphous semiconductor film 22 is successively intermittently irradiated and crystallized. Alternatively, the amorphous semiconductor film 22 is laid on a stage which can move in two directions crossing at right angles to each other, the stage is moved with respect to the fixed crystallization apparatus, and the surface of the amorphous semiconductor film may accordingly be irradiated with the light beams. Alternatively, with respect to the crystallization apparatus supported by an arm movable only in one direction, the amorphous semiconductor film 22 is moved in the direction crossing at right angles to the apparatus. In this system, the crystallization apparatus and amorphous semiconductor film 22 may be moved with respect to each other in two directions crossing at right angles to each other to irradiate the surface of the amorphous semiconductor film 22 with the light beams.

Figure 18C:
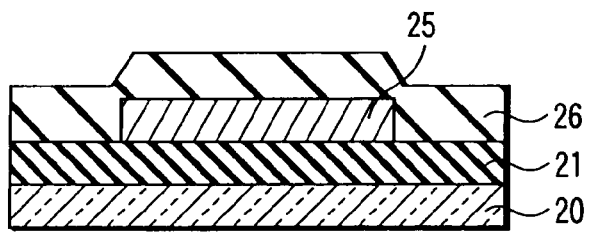
Figure 18D:
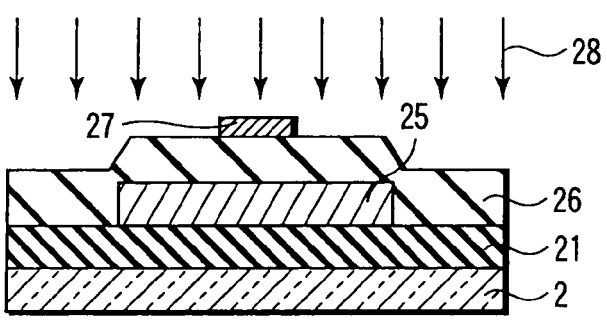

Next, as shown in FIG. 18C, a photolithography technique is used to process the polycrystalline semiconductor film or the single-crystal semiconductor film 24 into a semiconductor film 25 having an insular shape, and the chemical vapor phase growth process or sputter process is used to form an $SiO_2$ film having a film thickness of 20 nm to 100 nm as a gate insulating film 26 on the underlayer film 21 including the insular-shaped semiconductor film 25. Furthermore, as shown in FIG. 18D, a gate electrode 27 (e.g., silicide, MoW, and the like) is formed on the gate insulating film 26, and the gate electrode 27 is used as a mask to implant impurity ions 28 (phosphor for an N-channel transistor, boron for a P-channel transistor) into the semiconductor film 25. Thereafter, an anneal treatment (e.g., at 450° C. for one hour) is performed in a nitrogen atmosphere to activate the implanted impurities.

Figure 18E:
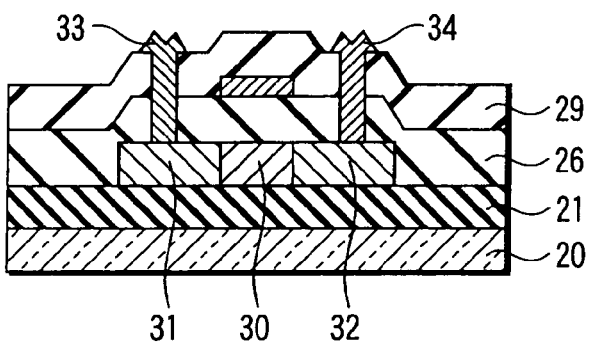

Next, as shown in FIG. 18E, an interlayer insulating film 29 is formed on the gate insulating film 26 contact holes are formed through the interlayer insulating film 29 and gate insulating film 26. A source electrode 33 and drain electrode 34 electrically connected to a source 31 and drain 32 between which a channel 30 is positioned are formed. At this time, the channel 30 is formed in accordance with the position of the large grain size crystal of the polycrystalline semiconductor film or the single-crystal semiconductor film 24 produced in the steps shown in FIGS. 18A and 18B.

By the above-described steps, a polycrystalline transistor or single-crystal semiconductor transistor can be formed. The polycrystalline transistor or single-crystal transistor manufactured in this manner can be applied to a driving circuit of a matrix circuit substrate of displays such as a liquid crystal display and electroluminescence (EL) display, or an integrated circuit of a memory (SRAM or DRAM) or CPU.

When the matrix circuit substrate including the thin film transistor is manufactured, the transparent substrate such as glass is used as the substrate, and the polycrystalline or amorphous semiconductor film is formed on the substrate. Next, the crystallization technique is used to produce the semiconductor film into the crystallized semiconductor film. Thereafter, as known in this field, the crystallized semiconductor film is separated into a large number of portions (insular-shaped regions) positioned in the matrix shape, and the thin film transistor is formed in each separated semiconductor portion by the manufacturing technique of the thin film transistor. Thereafter, as well known, a pixel electrode is formed on the substrate to be electrically connected to each thin film transistor, and the pixel is defined to complete the matrix circuit substrate.

Figure 19:
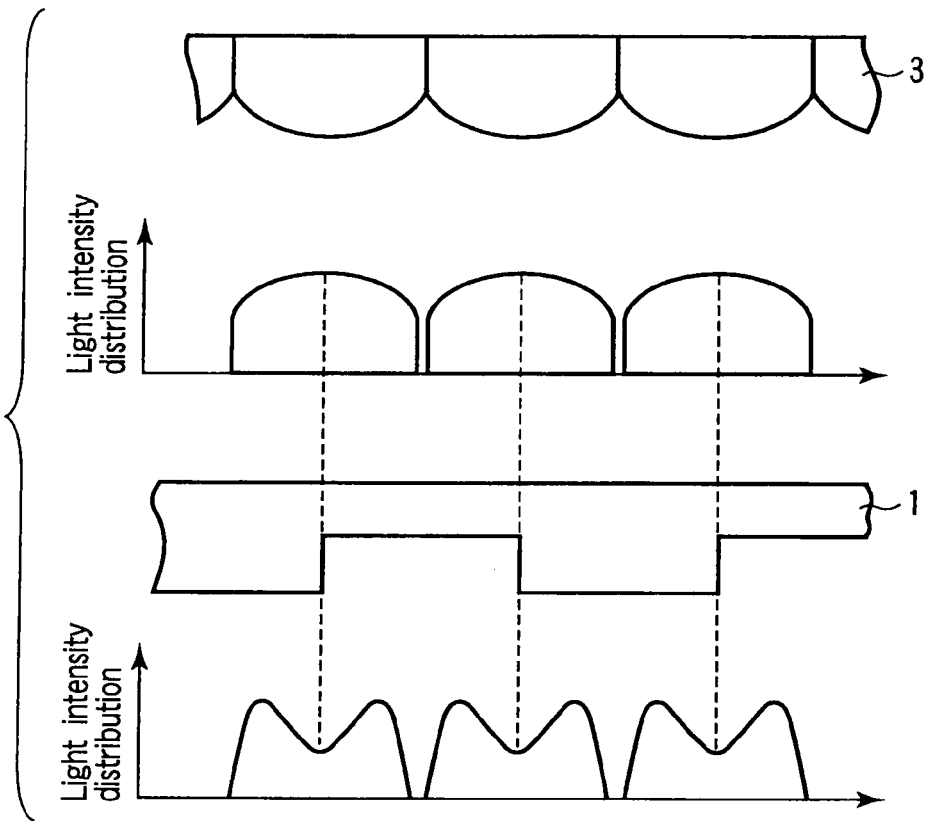
FIG. 19 is a view for illustrating a modification of FIG. 8B in which the filter is omitted.
Figure 20:
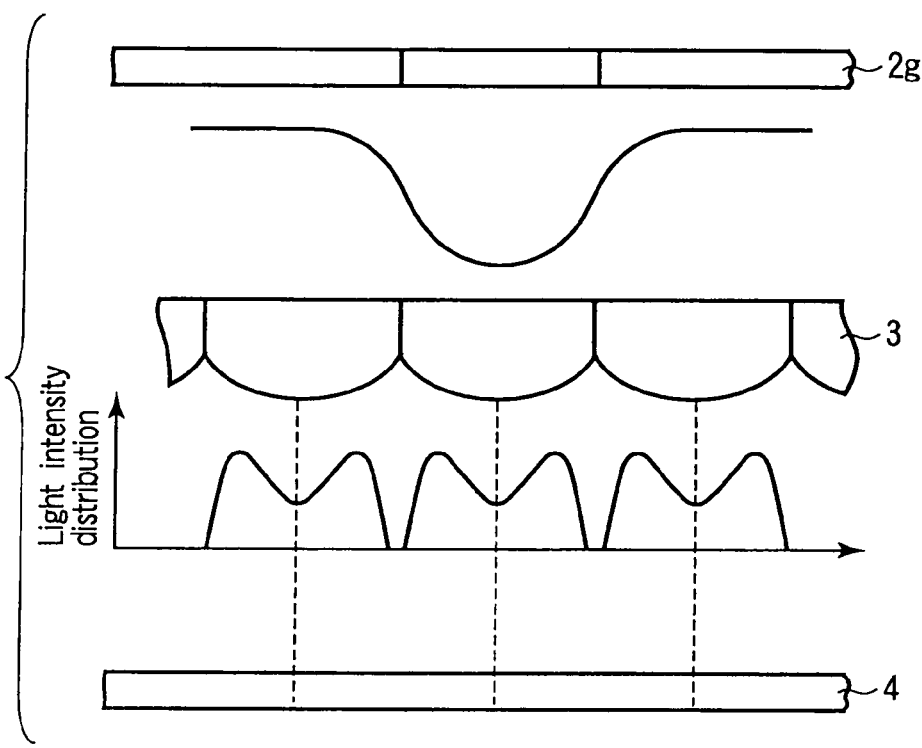
FIG. 20 is a view for illustrating a modification of FIG. 8B in which the phase shift mask is omitted.

Although the aforementioned embodiments use three components, that is a transmission filter, wavefront dividing element, and phase shift mask, the present invention is not limited to the combination of three components as illustrated in FIG. 19 and FIG. 20. In these figures, substantially same components as those shown in FIG. 8B are denoted by the same reference numbers and their details are omitted.

FIG. 19 shows a modification of the device shown in FIG. 8B, in which the transmission filter is omitted, so that a light beam emitted from a laser source may be directly incident on the wavefront dividing element 3.

FIG. 20 shows a modification of the device shown in FIG. 8B, in which the phase shift mask is omitted, so that a light beam from the wavefront dividing element may be directly incident on the semiconductor device.

As described above, according to the present invention, the two-steps inverse peak type light intensity distribution is formed on the semiconductor film of the substrate to be treated by the cooperative function of the transmission filter, wavefront dividing element, and/or phase shift mask. As a result, the sufficient lateral growth from the crystal nucleus is realized, and a crystallized semiconductor film having a large grain diameter can be produced. Since there is an inside inverse peak, the crystal nucleus can be limited to a narrow region, and a crystal growth start point, that is, the crystal grain can two-dimensionally be positioned with good accuracy.

Moreover, in the present invention, the light incident upon the wavefront dividing element is wavefront-divided by a plurality of optical elements, and the light beams condensed via the respective optical elements form light beams to surround a desired region in the corresponding phase shift portion and on the semiconductor film of the substrate to be treated. As a result, a large part of the light supplied from the optical illumination system can contribute to the crystallization of the desired region, and the crystallization can be realized with satisfactory light use efficiency.

What is claimed is:

1. An optical member comprising:
   a wavefront dividing portion which condenses a light beam having a homogeneous incident light intensity distribution so as to irradiate a predetermined region only; and
   an optical converting portion which converts the incident light beam into a light beam having an inverse peak type light intensity distribution.

2. The optical member according to claim 1, wherein the wavefront dividing portion is integrally formed with the optical converting portion.

* * * * *